(12) United States Patent
Chen et al.

(10) Patent No.: US 12,335,761 B2
(45) Date of Patent: Jun. 17, 2025

(54) METHOD AND APPARATUS FOR INDICATING MEASUREMENT PURPOSE OF CHANNEL STATE INFORMATION AND SYSTEM

(71) Applicant: FUJITSU LIMITED, Kawasaki (JP)

(72) Inventors: Zhe Chen, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 374 days.

(21) Appl. No.: 17/361,969

(22) Filed: Jun. 29, 2021

(65) Prior Publication Data

US 2021/0337415 A1    Oct. 28, 2021

Related U.S. Application Data

(63) Continuation of application No. PCT/CN2019/071037, filed on Jan. 9, 2019.

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ...... H04W 24/08; H04W 24/10; H04L 5/005; H04L 5/0057; H04L 5/0023; H04L 1/0072; H04B 7/0695; H04B 7/0626; H04B 17/24; H04B 17/345; H04B 17/309
See application file for complete search history.

(56) References Cited

U.S. PATENT DOCUMENTS

| | | | |
|---|---|---|---|
| 2013/0258965 | A1 | 10/2013 | Geirhofer et al. |
| 2016/0301505 | A1 | 10/2016 | Furuskog et al. |
| 2017/0117997 | A1 | 4/2017 | Park et al. |
| 2019/0297519 | A1 | 9/2019 | Han et al. |
| 2020/0007299 | A1 | 1/2020 | Han et al. |

(Continued)

FOREIGN PATENT DOCUMENTS

| | | |
|---|---|---|
| CN | 105991244 A | 10/2016 |
| CN | 106797649 A | 5/2017 |

(Continued)

OTHER PUBLICATIONS

Notice of Reasons for Refusal issued by the Japan Patent Office for corresponding Japanese Patent Application No. 2021-539609, mailed on Jul. 26, 2022, with an English translation.

(Continued)

*Primary Examiner* — Peter Chen
(74) *Attorney, Agent, or Firm* — Myers Wolin, LLC

(57) ABSTRACT

A method and apparatus for indicating a measurement purpose of channel state information (CSI) and a communication system. The method includes: a terminal equipment receives first indication information transmitted by a network device, the first indication information indicating a measurement purpose of a first channel state information (CSI) measurement resource set of the terminal equipment; and the terminal equipment determines the measurement purpose of the first CSI measurement resource set according to the first indication information. A network device and the terminal equipment may have a common understanding of a purpose of the same CSI measurement resource.

4 Claims, 8 Drawing Sheets

(56) References Cited

U.S. PATENT DOCUMENTS

| | | | |
|---|---|---|---|
| 2020/0068574 A1 | 2/2020 | Qin et al. | |
| 2021/0218453 A1* | 7/2021 | Song | H04W 72/0446 |

FOREIGN PATENT DOCUMENTS

| | | |
|---|---|---|
| CN | 108418667 A | 8/2018 |
| CN | 108810932 A | 11/2018 |
| CN | 108810966 A | 11/2018 |
| JP | 2015-517258 A | 6/2015 |

OTHER PUBLICATIONS

Huawei et al., "Multiplexing RSs and other signals", Agenda Item: 7.2.3.1, 3GPP TSG-RAN WG1 Meeting #91, R1-1719437, Reno, USA, Nov. 27-Dec. 1, 2017.

Huawei et al., "On requirements for L1-RSRP measurement for beam reporting", Agenda Item: 7.11.8.2, 3GPP TSG-RAN WG4 Meeting #89, R4-1815177, Spokane, US, Nov. 12-16, 2018.

Extended European search report with the supplementary European search report and the European search opinion Issued by the European Patent Office for corresponding European Patent Application No. 19909578.7-1216, dated Apr. 12, 2022.

Ericsson, "Draft CR on CPU occupancy rules for CSI-ReportConfig with higher layer parameter reportQuantity set to 'none'", 3GPP TSG-RAN WG1 Meeting #95, Change Request, 38.214 CR Draft rev—Current version: 15.3.0, R1-1814225, Spokane, USA, Nov. 12-16, 2018.

Intel Corporation, "Remaining issues on CSI reporting", Agenda Item: 7.1.2.2.2, 3GPP TSG-RAN WG1 Meeting #93, R1-1806506, Busan, South Korea, May 21-25, 2018.

Lenovo et al., "Remaining Issues on CSI reporting", Agenda Item: 7.1.2.2.2, 3GPP TSG-RAN WG1 Meeting #93, R1-1806340, Busan, South Korea, May 21-25, 2018.

ZTE, "Remaining issues on CSI reporting", Agenda Item: 7.1.2.2.2, 3GPP TSG-RAN WG1 Meeting #93, R1-1805827, Busan, South Korea, May 21-25, 2018.

Notice of Preliminary Rejection issued by the Korean Intellectual Property Office for corresponding Korean Patent Application No. 10-2021-7020752, mailed on Jul. 29, 2023, with an English translation.

ZTE, "Enhancements on multi-beam operation", Agenda item 7.2.8.3., 3GPP TSG RAN WG1 Meeting #95, R1-1812257, Spokane, USA, Nov. 12-16, 2018.

Notice of Reasons for Refusal issued by the Japan Patent Office for corresponding Japanese Patent Application No. 2022-153121, mailed on Jun. 20, 2023, with an English translation.

Qualcomm Incorporated, "Maintenance for CSI Measurement", Agenda Item: 7.1.2.2, 3GPP TSG RAN WG1 Meeting #94, R1-1809422, Gothenburg, Sweden, Aug. 20-24, 2018.

International Search Report and Written Opinion of the International Searching Authority issued by the China National Intellectual Property Administration for corresponding International Patent Application No. PCT/CN2019/071037, mailed on Jul. 8, 2019, with an English translation.

The partial supplementary European search report issued by the European Patent Office for corresponding European Patent Application No. 19909578.7-1212, mailed on Dec. 14, 2021.

Huawei et al., "General framework for CSI acquisition and beam management", Agenda Item: 6.1.2.2.1, 3GPP TSG-RAN WG1 Meeting #90, R1-1712226, Prague, Czech Republic, Aug. 21-25, 2017.

Ericsson, "CSI framework simplification", Agenda Item: 7.1.2.2, 3GPP TSG-RAN WG1 Meeting #92, R1-1803255, Athens, Greece, Feb. 26-Mar. 2, 2018.

Huawei et al., "Overview of the CSI configuration framework", Agenda Item: 10.4.3.2, 3GPP TSG-RAN WG2 Meeting #101, R2-1803705 (Same as R1-1802076), Athens, Greece, Feb. 26-Mar. 2, 2018.

Qualcomm Incorporated, "Corrections on SP CSI-RS / CSI-IM Resource Set Activation/Deactivation MAC CE", Agenda Item: 10.3.1.3, 3GPP TSG-RAN WG2 Meeting #102, R2-1808494, Busan, South Korea, May 21-25, 2018.

The Examination Report issued by the Indian Patent Office for corresponding Indian patent application No. 202137029116, mailed on Mar. 3, 2022.

First Notification of Office Action and Search Report issued by the China National Intellectual Property Administration for corresponding Chinese Patent Application No. 201980086491.7, dated May 25, 2023, with an English translation.

Hearing Notice issued by the Intellectual Property Office of India for corresponding Indian Patent Application No. 202137029116, mailed on Jun. 19, 2024, with an English translation.

* cited by examiner

METHOD AND APPARATUS FOR INDICATING MEASUREMENT PURPOSE OF CHANNEL STATE INFORMATION AND SYSTEM

CROSS-REFERENCE TO RELATED APPLICATION

This application is a continuation application of International Application PCT/CN2019/071037 filed on Jan. 9, 2019 and designated the U.S., the entire contents of which are incorporated herein by reference.

FIELD

This disclosure relates to the field of communications, and in particular to a method and apparatus for indicating a measurement purpose of channel state information and a system.

BACKGROUND

In high-frequency or low-frequency communication scenarios, accurate channel measurement techniques are required for improving communication transmission throughput and lowering communication delay. In a 5 generation-new radio system (5G-NR), a flexible channel state information (CSI) measurement and reporting mechanism meets requirements on accurate CSI in different scenarios, especially high-frequency communication scenarios. Generally speaking, a network device usually configures CSI measurement resources to allow a terminal equipment to measure CSI in corresponding resources. Furthermore, the network device needs to make the terminal equipment know calculation results of which CSI need to be fed back.

In existing techniques, a 5G-NR system may indicate a measurement purpose of CSI. That is, by indicating the number of CSI measurement resources corresponding to the CSI report resource, the terminal equipment may learn the measurement purpose of the CSI measurement resource, so as to perform corresponding feedback of calculation. FIG. 1 shows three pieces of different measurement feedback. As shown in FIG. 1, when a CSI report setting configuration (CSI-Report) is associated with a resource setting, for example, when the CSI-Report is associated with a channel measurement resource (CMR), the resource setting (such as a CMR) is used for layer 1 reference signal received power (L1-RSRP) channel measurement; when a CSI report setting configuration is associated with more than one resource settings, for example, the CSI-Report is associated with the CMR and a non-zero power CSI reference signal-based (NZP-CSI-RS based) interference measurement resource (IMR) (NZP-IMR for short), or the CSI-Report is associated with the CMR and a zero power CSI reference signal-based (ZP-CSI-RS based) interference measurement resource (IMR) (ZP-IMR for short), or the CSI-Report is associated with the CMR, the NZP-IMR and the ZP-IMR, a first resource setting (such as a CMR) is used for channel measurement instead of L1-RSRP measurement, and the other resource settings (such as the NZP-IMR and/or the ZP-IMR) are used for interference measurement.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in performing communications in high frequency band, if L1-RSRP-based channel measurement feedback is only relied on, a communication system is unable to successfully perform beam management in a strong interference environment. In order to better deal with interference by the beam management in high frequency band, a L1-SINR-based channel measurement feedback mechanism is indispensable, which may effectively make up for the deficiencies of existing mechanisms.

However, when L1-SINR is added as a new CSI reporting indicator into a framework of CSI measurement reporting, existing mechanisms of a 5G-NR system are unable to determine a purpose of measurement of a CSI resource in some cases. As shown in FIG. 2, when a CSI report setting configuration is associated with more than one resource settings, a terminal equipment is unable to determine purposes of these resource settings. A reason is that it is possible that channel measurement resources (CMRs) and interference measurement resources (IMRs) may be both configured at the same time for L1-SINR-based beam management measurement and general channel measurement (non-L1-SINR). If the terminal equipment is unable to distinguish a measurement purpose to which the CSI measurement resources correspond, it is possible that the following two situations may occur where:

1) the terminal equipment takes reference signals used for L1-SINR measurement for general channel measurement; this may not only lead to a sharp increase in complexity of CSI calculation, but also lead to inaccurate CSI estimation results; and 2) the terminal equipment takes reference signals used for general channel measurement for L1-SINR measurement; this may lead to inaccurate CSI estimation results.

In addition, for measurement reference signals of different purposes, the CSI calculation resources occupied thereby are also different. For example, when L1-SINR-based beam management is adopted, the calculation resources occupied by its corresponding measurement resources are unclear, which may make it impossible for the terminal equipment and network device to make an agreement on the number of occupied CSI calculation resources within a period of time, and as a result, the number of CSI measurements or calculations configured by the network device for the terminal equipment goes beyond the computing capacity of the terminal equipment, which affects the system performance.

In order to solve at least one of the above problems or other similar problems, embodiments of this disclosure provide a method and apparatus for indicating a measurement purpose of channel state information and a system.

According to a first aspect of the embodiments of this disclosure, there is provided a method for indicating a measurement purpose of channel state information, applicable to a terminal equipment, the method including:

a terminal equipment receives first indication information transmitted by a network device, the first indication information indicating a measurement purpose of a first channel state information (CSI) measurement resource set; and the terminal equipment determines the measurement purpose of the first CSI measurement resource set according to the first indication information.

According to a second aspect of the embodiments of this disclosure, there is provided a method for indicating a measurement purpose of channel state information, applicable to a network device, the method including:

a network device generates first indication information, the first indication information indicating a measurement purpose of a first channel state information (CSI) measurement resource set; and the network device transmits the first indication information to a terminal equipment.

According to a third aspect of the embodiments of this disclosure, there is provided an apparatus for indicating a measurement purpose of channel state information, configured in a terminal equipment, the apparatus including:

a receiving unit configured to receive first indication information transmitted by a network device, the first indication information indicating a measurement purpose of a first channel state information (CSI) measurement resource set; and a determining unit configured to determine the measurement purpose of the first CSI measurement resource set according to the first indication information.

According to a fourth aspect of the embodiments of this disclosure, there is provided an apparatus for indicating a measurement purpose of channel state information, configured in a network device, the apparatus including:

a generating unit configured to generate first indication information, the first indication information indicating a measurement purpose of a first CSI measurement resource set; and a transmitting unit configured to transmit the first indication information to a terminal equipment.

According to a fifth aspect of the embodiments of this disclosure, there is provided a method for indicating a measurement purpose of channel state information, applicable to a terminal equipment, the method including:

a terminal equipment receives second indication information transmitted by a network device, the second indication information indicating that a second channel state information (CSI) measurement resource set is related to at least one of the following:

whether repetition is configured;

whether a synchronization signal block (SSB) is contained; and corresponding report information;

the terminal equipment determining a measurement purpose of the second CSI measurement resource set according to the second indication information.

According to a sixth aspect of the embodiments of this disclosure, there is provided a method for indicating a measurement purpose of channel state information, applicable to a network device, the method including:

a network device generating second indication information, the second indication information indicating that a second CSI measurement resource set is related to at least one of the following:

whether repetition is configured;

whether a synchronization signal block (SSB) is contained; and corresponding report information;

the network device transmits the second indication information to a terminal equipment.

According to a seventh aspect of the embodiments of this disclosure, there is provided an apparatus for indicating a measurement purpose of channel state information, configured in a terminal equipment, the apparatus including:

a receiving unit configured to receive second indication information transmitted by a network device, the second indication information indicating that a second channel state information (CSI) measurement resource set is related to at least one of the following:

whether repetition is configured;

whether a synchronization signal block (SSB) is contained; and corresponding report information;

a determining unit configured to determine a measurement purpose of the second CSI measurement resource set according to the second indication information.

According to an eighth aspect of the embodiments of this disclosure, there is provided an apparatus for indicating a measurement purpose of channel state information, configured in a network device, the apparatus including:

a generating unit configured to generate second indication information, the second indication information indicating that a second CSI measurement resource set is related to at least one of the following:

whether repetition is configured;

whether a synchronization signal block (SSB) is contained; and corresponding report information;

a transmitting unit configured to transmit the second indication information to a terminal equipment.

According to a ninth aspect of the embodiments of this disclosure, there is provided a method for indicating a resource occupied for channel state information calculation, applicable to a terminal equipment, the method including:

a terminal equipment receives third indication information transmitted by a network device, the third indication information indicating at least one of the following conditions associated with a first CSI report set that:

the first CSI report set needs to perform CSI report, and a content of the CSI report is related to at least one of an L1-SINR, L1-RSRQ and L1-RSRP;

the first CSI report set needs not to perform CSI report;

a CSI channel measurement resource set associated with the first CSI report set is not configured with repetition;

a CSI channel measurement resource set associated with the first CSI report set is configured with repetition;

a CSI channel measurement resource set associated with the first CSI report set is not used for time-frequency pursuit;

a CSI channel measurement resource set associated with the first CSI report set is used for time-frequency pursuit;

a CSI measurement resource set associated with the first CSI report set only includes channel measurement resource (s); and a CSI measurement resource set associated with the first CSI report set includes channel measurement resource(s) and interference measurement resource(s);

the terminal equipment determines, according to the third indication information, a time (T) and the number (K) of CSI processing units (CPUs) occupied by CSI report or CSI measurement to which the first CSI report set corresponds.

According to a tenth aspect of the embodiments of this disclosure, there is provided a method for indicating a resource occupied for channel state information calculation, applicable to a network device, the method including:

a network device generates third indication information, the third indication information indicating at least one of the following conditions associated with a first CSI report set that:

the first CSI report set needs to perform CSI report, and a content of the CSI report is related to at least one of an L1-SINR, L1-RSRQ and L1-RSRP;

the first CSI report set needs not to perform CSI report;

a CSI channel measurement resource set associated with the first CSI report set is not configured with repetition;

a CSI channel measurement resource set associated with the first CSI report set is configured with repetition;

a CSI channel measurement resource set associated with the first CSI report set is not used for time-frequency pursuit;

a CSI channel measurement resource set associated with the first CSI report set is used for time-frequency pursuit;

a CSI measurement resource set associated with the first CSI report set only includes channel measurement resource(s); and a CSI measurement resource set associated with the first CSI report set includes channel measurement resource(s) and interference measurement resource(s);

the network device transmits the third indication information to a terminal equipment, the third indication information being used by the terminal equipment to determine a time (T) and the number (K) of CSI processing units (CPUs) occupied by CSI report or CSI measurement to which the first CSI report set corresponds.

According to an eleventh aspect of the embodiments of this disclosure, there is provided an apparatus for indicating a resource occupied for channel state information calculation, configured in a terminal equipment, the method including:

a receiving unit configured to receive third indication information transmitted by a network device, the third indication information indicating at least one of the following conditions associated with a first CSI report set that:

the first CSI report set needs to perform CSI report, and a content of the CSI report is related to at least one of an L1-SINR, L1-RSRQ and L1-RSRP;

the first CSI report set needs not to perform CSI report;

a CSI channel measurement resource set associated with the first CSI report set is not configured with repetition;

a CSI channel measurement resource set associated with the first CSI report set is configured with repetition;

a CSI channel measurement resource set associated with the first CSI report set is not used for time-frequency pursuit;

a CSI channel measurement resource set associated with the first CSI report set is used for time-frequency pursuit;

a CSI measurement resource set associated with the first CSI report set only includes channel measurement resource(s); and a CSI measurement resource set associated with the first CSI report set includes channel measurement resource(s) and interference measurement resource(s); and a determining unit configured to determine, according to the third indication information, a time (T) and the number (K) of CSI processing units (CPUs) occupied by CSI report or CSI measurement to which the first CSI report set corresponds.

According to a twelfth aspect of the embodiments of this disclosure, there is provided an apparatus for indicating a resource occupied for channel state information calculation, configured in a network device, the method including:

a generating unit configured to generate third indication information, the third indication information indicating at least one of the following conditions associated with a first CSI report set that:

the first CSI report set needs to perform CSI report, and a content of the CSI report is related to at least one of an L1-SINR, L1-RSRQ and L1-RSRP;

the first CSI report set needs not to perform CSI report;

a CSI channel measurement resource set associated with the first CSI report set is not configured with repetition;

a CSI channel measurement resource set associated with the first CSI report set is configured with repetition;

a CSI channel measurement resource set associated with the first CSI report set is not used for time-frequency pursuit;

a CSI channel measurement resource set associated with the first CSI report set is used for time-frequency pursuit;

a CSI measurement resource set associated with the first CSI report set only includes channel measurement resource(s); and a CSI measurement resource set associated with the first CSI report set includes channel measurement resource(s) and interference measurement resource(s); and a transmitting unit configured to transmit the third indication information to a terminal equipment, the third indication information being used by the terminal equipment to determine a time (T) and the number (K) of CSI processing units (CPUs) occupied by CSI report or CSI measurement to which the first CSI report set corresponds.

According to a thirteenth aspect of the embodiments of this disclosure, there is provided a terminal equipment, including the apparatus as described in the third, or the seventh, or the eleventh aspect.

According to a fourteenth aspect of the embodiments of this disclosure, there is provided a network device, including the apparatus as described in the fourth, or the eighth, or the twelfth aspect.

According to a fifteenth aspect of the embodiments of this disclosure, there is provided a communication system, including the terminal equipment as described in the thirteenth aspect and the network device as described in the fourteenth aspect.

According to another aspect of the embodiments of this disclosure, there is provided a computer readable program, which, when executed in a terminal equipment, will cause a computer to carry out the method described in the first, or the fifth, or the ninth aspect in the terminal equipment.

According to a further aspect of the embodiments of this disclosure, there is provided a storage medium storing a computer readable program, which will cause a computer to carry out the method described in the first, or the fifth, or the ninth aspect in a terminal equipment.

According to yet another aspect of the embodiments of this disclosure, there is provided a computer readable program, which, when executed in a network device, will cause a computer to carry out the method described in the second, or the sixth, or the tenth aspect in the network device.

According to still another aspect of the embodiments of this disclosure, there is provided a storage medium storing a computer readable program, which will cause a computer to carry out the method described in the second, or the sixth, or the tenth aspect in a network device.

An advantage of the embodiments of this disclosure exists in that according to at least one aspect of the embodiments of this disclosure, the network device and the terminal equipment may have a common understanding of a purpose of the same CSI measurement resource, thereby avoiding CSI measurement errors and corresponding transmission failures due to misunderstanding of the network device and the terminal equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1:
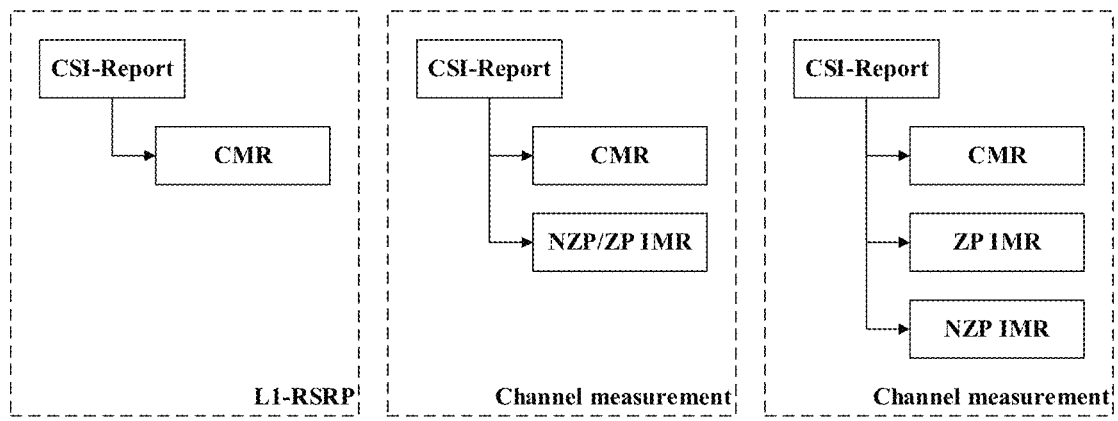
FIG. 1 is a schematic diagram of three different pieces of measurement feedback.
Figure 2:
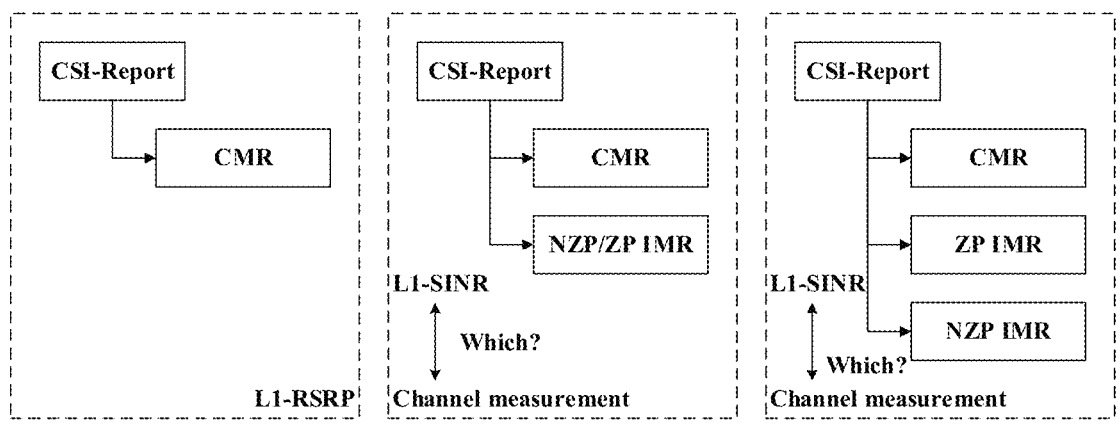
FIG. 2 is a schematic diagram of an existing measurement feedback mechanism with L1-SINR-based channel measurement feedback being introduced.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 3:
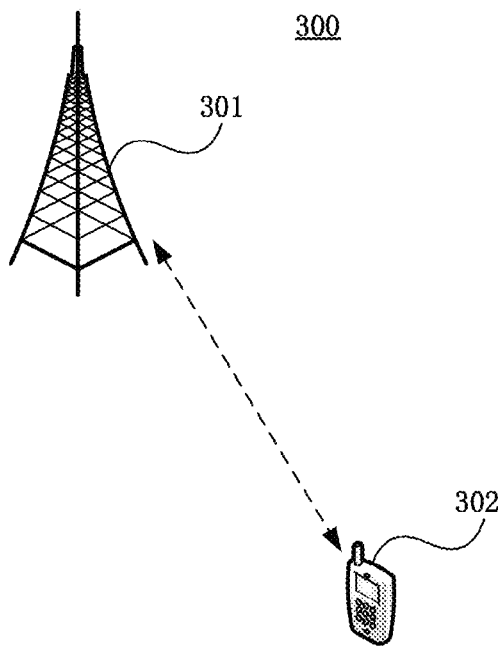
FIG. 3 is a schematic diagram of a communication system of an embodiment of this disclosure.

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302. For the sake of simplicity, an example having only one terminal equipment is schematically given in FIG. 3. And the network device 301 is, for example, a network device gNB in an NR system.

In the embodiment of this disclosure, existing traffics or traffics that may be implemented in the future may be performed between the network device 301 and the terminal equipment 302. For example, such traffics may include but not limited to enhanced mobile broadband (eMBB), massive machine type communication (MTC), and ultra-reliable and low-latency communication (URLLC), etc.

The terminal equipment 302 may transmit data to the network device 301, for example, in a grant-free transmission mode. The network device 301 may receive data transmitted by one or more terminal equipments 302, and feed back information (such as acknowledgement ACK/non-acknowledgement NACK) to the terminal equipment 302, and the terminal equipment 302 may acknowledge terminating a transmission process according to the feedback information, or may further perform new data transmission, or may perform data retransmission.

Implementations of the embodiments of this disclosure shall be described below with reference to the accompanying drawings. These implementations are illustrative only, and are not intended to limit this disclosure.

Embodiment 1

Figure 4:
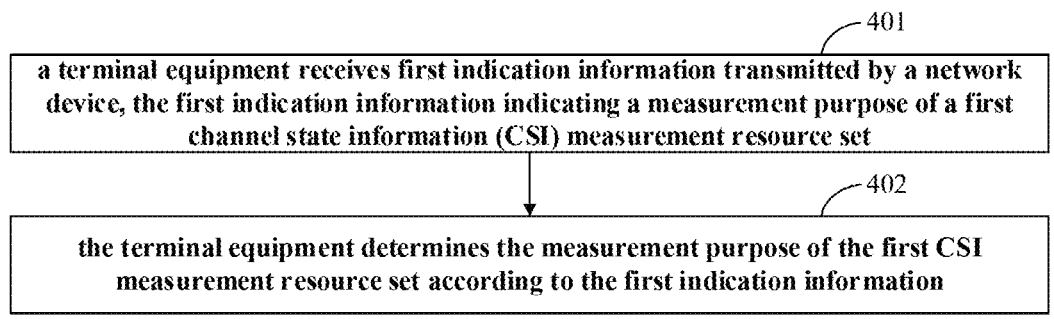
FIG. 4 is a schematic diagram of the method for indicating a measurement purpose of CSI of Embodiment 1.

The embodiment of this disclosure provides a method for indicating a measurement purpose of CSI, applicable to a terminal equipment. FIG. 4 is a schematic diagram of the method for indicating a measurement purpose of CSI of this embodiment. Referring to FIG. 4, the method includes:

step 401: a terminal equipment receives first indication information transmitted by a network device, the first indication information indicating a measurement purpose of a first channel state information (CSI) measurement resource set; and step 402: the terminal equipment determines the measurement purpose of the first CSI measurement resource set according to the first indication information.

In this embodiment, the network device directly indicates a measurement purpose of a CSI measurement resource set via the above first indication information. Therefore, the terminal equipment may directly determine the measurement purpose of the CSI measurement resource set after receiving the first indication information. Thus, CSI measurement errors due to misunderstanding of the purpose of the CSI measurement resource set by the network device and the terminal equipment may be avoided.

In this embodiment, the above measurement purpose may be channel measurement, or interference measurement, or channel measurement and interference measurement. The channel measurement may be channel measurement used for beam management, or channel measurement used for CSI acquisition, or channel measurement used for time-frequency pursuit, or any combination thereof.

In this embodiment, the channel measurement used for beam management may include at least one of the following:
channel measurement used for L1-RSRP calculation;
channel measurement used for L1-RSRQ calculation; and
channel measurement used for L1-SINR calculation.

In this embodiment, the channel measurement used for CSI acquisition may include at least one of the following:
acquiring channel quality information, a corresponding feedback parameter of the terminal equipment being a channel quality indicator (CQI);
acquiring spatial multiplexing information, a corresponding feedback parameter of the terminal equipment being a rank indicator (RI);
acquiring precoding information, a corresponding feedback parameter of the terminal equipment being a precoding matrix indicator (PMI); and
acquiring a strongest transmission layer, a corresponding feedback parameter of the terminal equipment being a layer indicator (LI).

What described above are examples only. Types of the channel measurement and interference measurement are not limited in this embodiment, and reference may be made to existing standards or future-developed channel measurement or interference measurement techniques.

In this embodiment, at least one CSI measurement resource in the first CSI measurement resource set may be used to perform at least one of the following measurements:
channel measurement;
interference measurement;
ZP CSI-RS based interference measurement; and
NZP CSI-RS based interference measurement.

Therefore, the terminal equipment may acknowledge which one or more of the above types are measurement purposes of the CSI measurement resources in the first CSI measurement resource set according to the first indication information.

In this embodiment, the above first CSI measurement resource set may be any one of the following:

a set including only one reference signal resource;

a set including one or more reference signal resources and corresponding to a CSI measurement resource set; and a set including one or more reference signal resources and corresponding to one or more CSI measurement resource sets.

Therefore, the terminal equipment may acknowledge measurement purposes of the reference signal resources in any one of the above sets according to the first indication information.

In this embodiment, the above one or more CSI measurement resource sets may be associated with a CSI report set.

In this embodiment, the above first CSI measurement resource set may include at least one of the following reference signal resources:

a synchronization signal block (SSB);

a channel state information reference signal (CSI-RS); and a channel state information interference measurement (CSI-IM).

Therefore, the terminal equipment may acknowledge the measurement purposes of the reference signal resources included in the first CSI measurement resource set according to the first indication information.

In this embodiment, the measurement purpose of the first CSI measurement resource set may be identical to a measurement purpose of another CSI measurement resource set (referred to as a second CSI measurement resource set), and the first CSI measurement resource set is related to the second CSI measurement resource set.

In one implementation, the second CSI measurement resource set may be a set of all CSI measurement resources.

In this implementation, the first CSI measurement resource set may be a subset of the second CSI measurement resource set, that is, the network device indicates a measurement purpose of a part of the CSI measurement resources via the first indication information.

In this implementation, the first CSI measurement resource set and the second CSI measurement resource set may be identical, that is, the network device indicates measurement purpose of all CSI measurement resources via the first indication information. In addition, the first CSI measurement resource set may correspond to all resources with which a CSI report is associated.

In this implementation, the CSI report set with which the second CSI measurement resource set is associated and the CSI report set with which the first CSI measurement resource set is associated may be identical. Hence, the first indication information may indicate more flexibly. For example, a CSI measurement resource set to which a CSI report set A corresponds is {A0, A1, A2, A3}. The first CSI measurement resource set is A1, and the second CSI measurement resource set is {A0, A1, A2, A3}. thus, it may be extended to indicating all or a part of resources included in the entire CSI report set A by indicating a purpose of one resource.

With the method of this embodiment, the network device directly indicates the measurement purpose of the CSI measurement resource set, thereby avoiding CSI measurement errors due to misunderstanding of the measurement purpose of the CSI measurement resource set by the network device and the terminal equipment.

Embodiment 2

The embodiment provides a method for indicating a measurement purpose of CSI, applicable to a network device. This method is processing at a network device side corresponding to the method of Embodiment 1, with contents identical to those in Embodiment 1 being not going to be described herein any further.

Figure 5:
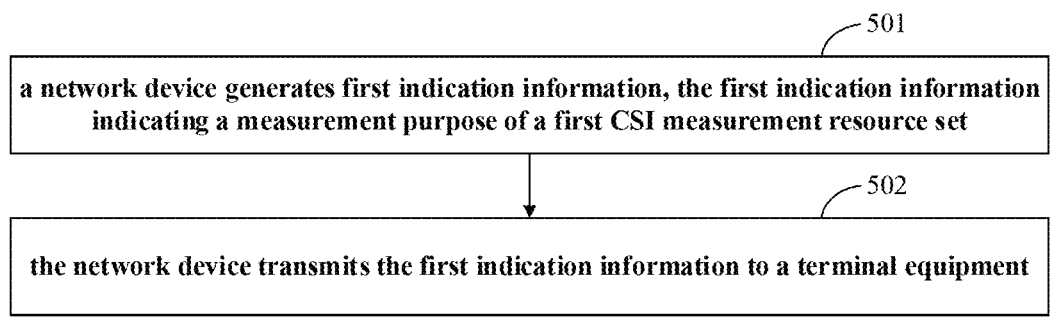
FIG. 5 is a schematic diagram of the method for indicating a measurement purpose of CSI of Embodiment 2.

FIG. 5 is a schematic diagram of the method for indicating a measurement purpose of CSI of this embodiment. As shown in FIG. 5, the method includes:

step 501: a network device generates first indication information, the first indication information indicating a measurement purpose of a first CSI measurement resource set; and step 502: the network device transmits the first indication information to a terminal equipment.

In this embodiment, a manner of generating the first indication information is not limited.

With the method of this embodiment, the network device directly indicates the measurement purpose of the CSI measurement resource set, thereby avoiding CSI measurement errors due to misunderstanding of the measurement purpose of the CSI measurement resource set by the network device and the terminal equipment.

Embodiment 3

Figure 6:
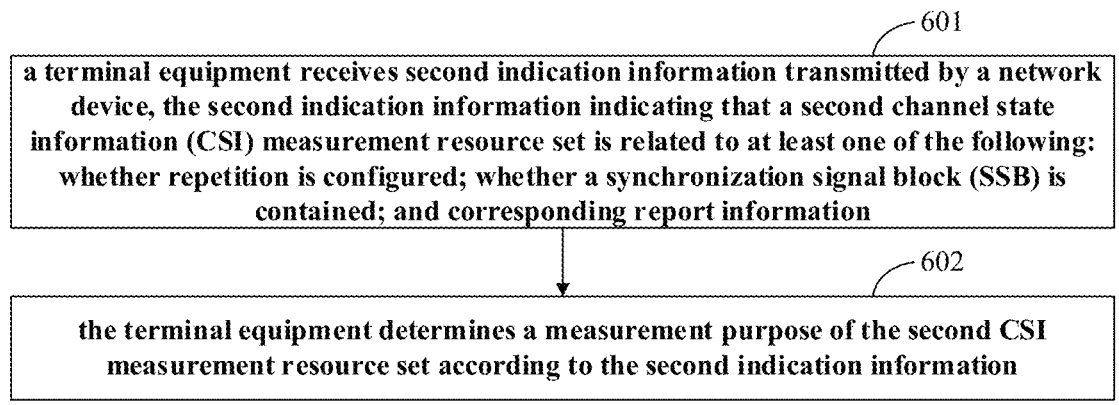
FIG. 6 is a schematic diagram of the method for indicating a measurement purpose of CSI of Embodiment 3.

The embodiment of this disclosure provides a method for indicating a measurement purpose of CSI, applicable to a terminal equipment. Different from the methods in embodiments 1 and 2 where indication is performed directly, the measurement purpose of the first CSI measurement resource set is indirectly indicated in this embodiment. FIG. 6 is a schematic diagram of the method for indicating a measurement purpose of CSI of this embodiment. Referring to FIG. 6, the method includes:

step 601: a terminal equipment receives second indication information transmitted by a network device, the second indication information indicating that a second channel state information (CSI) measurement resource set is related to at least one of the following: whether repetition is configured; whether a synchronization signal block (SSB) is contained; and corresponding report information;

step 602: the terminal equipment determines a measurement purpose of the second CSI measurement resource set according to the second indication information.

In this embodiment, the network device indicates via the second indication information that a CSI measurement resource set (referred to as a second CSI measurement resource set) is related to one or some aspects. Hence, after receiving the second indication information, the terminal equipment may indirectly determine the measurement purpose of the CSI measurement resource set, thereby avoiding CSI measurement errors due to misunderstanding of the measurement purpose of the CSI measurement resource set by the network device and the terminal equipment.

Generally speaking, a CSI measurement resource set used for beam management uses an indication "repetition=on". Therefore, an IE "repetition" has a strong correlation with a measurement purpose of CSI-RS (especially beam management). In this embodiment, whether the IE is configured may be taken as a basis for determining whether the CSI measurement resource set is for beam management (such as L1-SINR or L1-RSRP or L1-RSRQ, etc.). In addition, an SSB itself occupies less time-frequency resources and is not suitable for being taken as a measurement purpose of CSI acquisition or time-frequency pursuit. Therefore, when measurement resources include SSB resources, the purpose of the measurement resource set may be used for beam management (L1-SINR or L1-RSRP or L1-RSRQ etc.). In addition, for a CSI measurement resource set, its corresponding reported contents may indirectly indicate the purpose of the CSI measurement resource in many cases. For example, if a reported content corresponding to a CSI measurement resource is related to L1-SINR, L1-RSRP and L1-RSRQ, the set may be used for beam management, and if the set is related to PMI, LI, CQI, and RI, etc., the set may be used for CSI acquisition.

In one implementation of this embodiment, in the CSI measurement resource set for channel measurement associated with the CSI report set corresponding to the second CSI measurement resource set, if the above "repetition" is configured, the measurement purpose of the second CSI measurement resource set is channel measurement for beam management.

In this implementation, the above "repetition" refers to an IE in RRC signaling, which is used to configure an NZP CSI-RS measurement set. When the set is configured with the above "repetition", it may have two possible states: repetition=on and repetition=off.

In a case where repetition=on, all NZPCSI-RS resources in the above NZP CSI-RS measurement set are transmitted by the same spatial filter, and each of the above NZPCSI-RS resources is transmitted on different OFDM symbols.

In a case where repetition=off, the terminal equipment shall not assume that all CSI-RS resources in the NZP CSI-RS measurement set are transmitted by the same spatial filter.

Therefore, the terminal equipment may determine the measurement purpose of the second CSI measurement resource set according to the above relationship (for the second CSI measurement resource set, whether "repetition" is configured) indicated by the second indication information.

In another implementation of this embodiment, in the CSI measurement resource set for channel measurement associated with the CSI report set corresponding to the second CSI measurement resource set, if the above "SSB" is included, the measurement purpose of the above second CSI measurement resource set is for channel measurement for beam management. The above CSI measurement resource set used for channel measurement including "SSB" refers to that the CSI measurement resource set only includes "SSB" resources or the CSI measurement resource set includes not only "SSB" resources but also "CSI-RS" resources. The SSB is a synchronization signal/physical broadcast channel (SS/PBCH) block.

Therefore, the terminal equipment may determine the measurement purpose of the second CSI measurement resource set according to the relationship indicated by the second indication information (the second CSI measurement resource set includes the "SSB"). In addition, the second CSI measurement resource may include only CSI measurement resources, or may include CSI measurement resources and interference measurement resources related to the CSI measurement resources.

In a further implementation of this embodiment, if the CSI measurement resource used for channel measurement in the second CSI measurement resource set includes at least one CSI-RS set and the CSI-RS set is configured with "repetition", the measurement purpose of the second CSI measurement resource set is channel measurement for beam management, and the second CSI measurement resource set includes at least one of the following: a CSI measurement resource used for channel measurement, and an interference measurement resource related to the CSI measurement resource used for channel measurement.

Thus, the terminal equipment may determine the measurement purpose of the second CSI measurement resource set according to the relationship indicated by the above second indication information (the second CSI measurement resource set includes a CSI-RS, and the CSI-RS is configured with "repetition"). And the second CSI measurement resource set may include only CSI measurement resources used for channel measurement, or include not only the CSI measurement resources used for channel measurement, but also interference measurement resources related to the CSI measurement resources used for channel measurement.

In another implementation of this embodiment, if the report information corresponding to the CSI measurement resources used for channel measurement in the second CSI measurement resource set is related to at least one of L1-RSRP, L1-RSRQ, and an L1-SINR, the measurement purpose of the second CSI measurement resource set is channel measurement for beam management, and the second CSI measurement resource set includes at least one of the following: CSI measurement resources used for channel measurement, and interference measurement resources related to the CSI measurement resources used for channel measurement.

Therefore, the terminal equipment may determine the measurement purpose of the second CSI measurement resource set according to the relationship indicated by the second indication information (the report information is related to at least one of L1-RSRP, L1-RSRQ and an L1-SINR). And the second CSI measurement resource set may include only CSI measurement resources used for channel measurement, or may include not only the CSI measurement resources used for channel measurement, but also interference measurement resources related to the CSI measurement resources used for channel measurement.

In the above implementation of this embodiment, the channel measurement used for beam management may be at least one of the following: channel measurement used for L1-RSRP calculation, channel measurement used for L1-RSRQ calculation, and channel measurement used for L1-SINR calculation. Implementations of channel measurement used for beam management are not limited in this embodiment.

In a further implementation of this embodiment, if the CSI measurement resources used for channel measurement in the second CSI measurement resource set include at least one CSI-RS set and the CSI-RS set is not configured with "repetition", the measurement purpose of the second CSI measurement resource set is CSI acquisition or time-frequency pursuit, and the second CSI measurement resource set includes at least one of the following: CSI measurement resources used for channel measurement, and interference measurement resources related to the CSI measurement resources used for channel measurement.

Therefore, the terminal equipment may determine the measurement purpose of the second CSI measurement resource set according to the relationship indicated by the second indication information (the second CSI measurement resource set includes an CSI-RS, and the CSI-RS is not configured with "repetition"). And the second CSI measurement resource set may include only CSI measurement resources used for channel measurement, or may include not only the CSI measurement resources used for channel measurement, but also interference measurement resources related to the CSI measurement resources used for channel measurement.

In still another implementation of this embodiment, if the report information corresponding to the CSI measurement resources used for channel measurement in the second CSI measurement resource set is related to at least one of a CQI, a PMI, an RI and L1, the measurement purpose of the second CSI measurement resource set is CSI acquisition or time-frequency pursuit, and the second CSI measurement resource set includes at least one of the following: CSI measurement resources used for channel measurement, and interference measurement resources related to the CSI measurement resources used for channel measurement.

Therefore, the terminal equipment may determine the measurement purpose of the second CSI measurement resource set according to the relationship indicated by the second indication information (the report information is related to at least one of a CQI, a PMI, an RI and L1). And the second CSI measurement resource set may include only CSI measurement resources used for channel measurement, or may include not only the CSI measurement resources used for channel measurement, but also interference measurement resources related to the CSI measurement resources used for channel measurement.

In yet another implementation of this embodiment, the measurement purpose of the second CSI measurement resource set is for L1-RSRP or L1-RSRQ measurement if at least one of the following conditions is satisfied:

a first condition: report information corresponding to a CSI measurement resource set used for channel measurement in the second CSI measurement resource set being related to "no report";

a second condition: a CSI measurement resource set used for channel measurement in the second CSI measurement resource set being not used for time-frequency pursuit; and a third condition: a CSI report set corresponding to the second CSI measurement resource set being only associated with CSI measurement resources used for channel measurement.

Therefore, when the terminal equipment acknowledges according to the above second indication information that at least one of the above conditions is satisfied, it may determine that the measurement purpose of the second CSI measurement resource set is L1-RSRP or L1-RSRQ measurement.

In this implementation, in the above second condition, the CSI measurement resource set used for channel measurement is not used for time-frequency pursuit, that is, the CSI measurement resource set used for channel measurement is not configured with trs-info, the trs-info IE being used to indicate that all CSI-RS resources in the set have identical antenna ports.

In this implementation, in the above third condition, being only associated with the CSI measurement resources used for channel measurement refers that, being not associated with the interference measurement resources.

In yet still another implementation of this embodiment, the measurement purpose of the second CSI measurement resource set is L1-SINR measurement if at least one of the following conditions is satisfied:

a fourth condition: report information corresponding to a CSI measurement resource set used for channel measurement in the second CSI measurement resource set being related to "no report";

a fifth condition: a CSI measurement resource set used for channel measurement in the second CSI measurement resource set being not used for time-frequency pursuit; and a sixth condition: a CSI report set corresponding to the second CSI measurement resource set being associated with CSI measurement resources used for channel measurement and CSI measurement resources used for interference measurement.

Therefore, when the terminal equipment acknowledges according to the above second indication information that at least one of the above conditions is satisfied, it may determine that the measurement purpose of the second CSI measurement resource set is L1-SINR measurement.

In this implementation, a meaning of the fifth condition is identical to that of the second condition, and shall not be described herein any further.

In this embodiment, if the CSI measurement resources used for channel measurement in the second CSI measurement resource set include one of a CSI-RS and an SSB, a relationship between the CSI-RS or SSB and a corresponding interference measurement resource is of a quasi-colocation (QCL) type C and/or a quasi-colocation type D.

Figure 7:
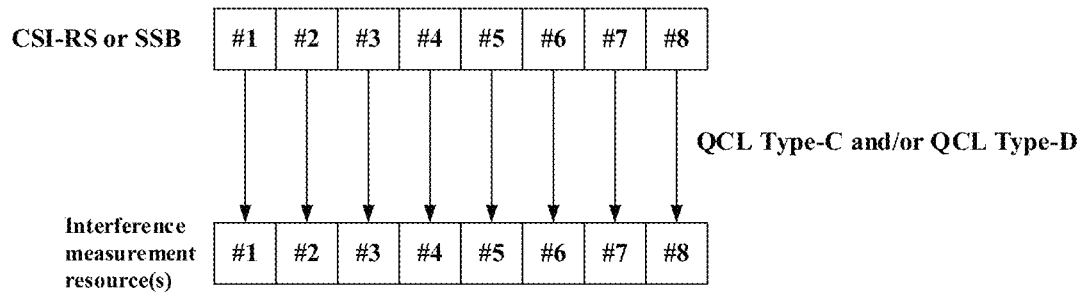
FIG. 7 is a schematic diagram of a spatial relationship between a CSI-RS or an SSB and an interference measurement resource.

That is, the CSI measurement resources used for channel measurement in the second CSI measurement resource set include only CSI-RSs or include only SSBs, and a relationship between the CSI measurement resources (CSI-RSs or SSBs) and corresponding interference measurement resources is of the QCL Type-C and/or the QCL Type-D. FIG. 7 is a schematic diagram of the relationship between the CSI-RSs or SSBs and the corresponding interference measurement resources.

In this embodiment, if the CSI measurement resources used for channel measurement in the second CSI measurement resource set include CSI-RSs and SSBs, a relationship between the CSI-RSs and SSBs and corresponding interference measurement resources is of the QCL Type-C and/or the QCL Type-D.

Figure 8:
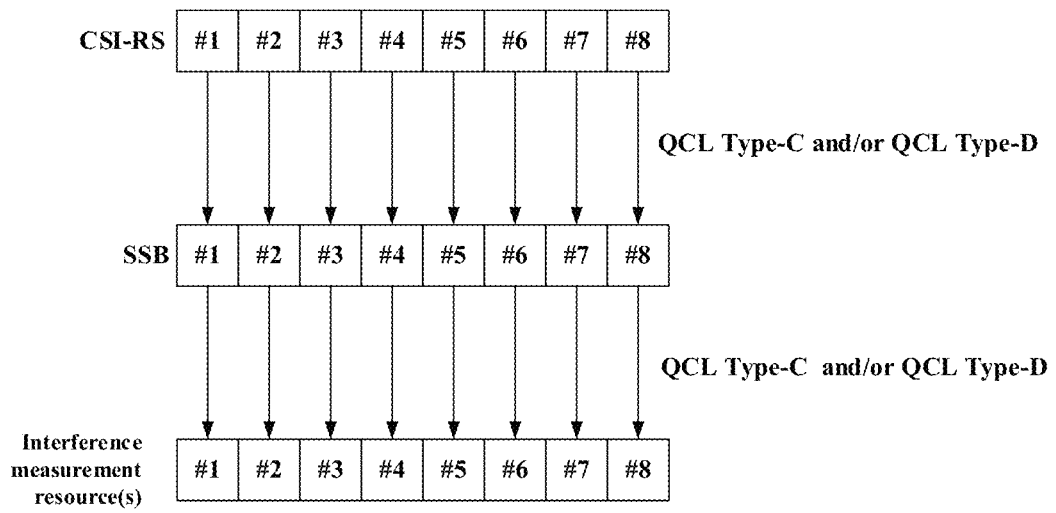
FIG. 8 is a schematic diagram of a spatial relationship between a CSI-RS and an SSB and an interference measurement resource.

That is, the CSI measurement resources used for channel measurement in the second CSI measurement resource set include not only CSI-RSs but also SSBs, the relationship between the CSI measurement resources (CSI-RSs and SSBs) and the corresponding interference measurement resources is of the QCL Type-C and/or QCL Type-D. FIG. 8 is a schematic diagram of the relationship between the CSI-RSs and SSBs and the corresponding interference measurement resources.

In this embodiment, if the CSI measurement resources used for channel measurement in the second CSI measurement resource set include CSI-RSs and SSBs, the numbers of the CSI-RSs and SSBs may be identical, and they may one by one to correspond each other according to their orders in respective resource sets, as shown in FIG. 8.

In this embodiment, the CSI measurement resource used for channel measurement in the second CSI measurement resource set and a QCL assumption of the corresponding interference measurement resources may be identical. Thus, when the resources used for channel measurement and the resources used for interference measurement use identical QCL assumptions, their spatial filters for reception are identical. Hence, consistency of the channel measurement and the interference measurement may be ensured, and inaccurate measurement results may be avoided.

In this embodiment, the number of subsets of CSI measurement resources used for channel measurement in the second CSI measurement resource set and the number of subsets of corresponding interference measurement resources may be identical and sequentially correspond, as shown in FIG. 7 or 8. The subsets may have only one reference signal (an SSB or a CSI-RS), or they may have multiple reference signals. In addition, serial numbers (#1, and #2, etc.) in FIG. 7 and FIG. 8 may refer to one or more than one reference signal resources.

In this embodiment, if the second CSI measurement resource set is related to at least one of L1-RSRP, L1-RSRQ and an L1-SINR, contents reported by the terminal equipment may consist of a part (CSI feedback consist of a single part). Therefore, as the reported contents of L1-RSRP, L1-RSRQ and L1-SINR need less bits, there is no need to divide them into multiple parts for performing CSI feedback. Therefore, all CSI feedback needs to be reported at a time to avoid additional overhead.

With the method of this embodiment, the network device indirectly indicates the measurement purpose the CSI measurement resource set, thereby avoiding CSI measurement errors due to misunderstanding of the measurement purpose of the CSI measurement resource set by the network device and the terminal equipment.

Embodiment 4

The embodiment provides a method for indicating a measurement purpose of CSI, applicable to a network device. This method is processing at a network device side corresponding to the method of Embodiment 3, with contents identical to those in Embodiment 3 being not going to be described herein any further.

Figure 9:
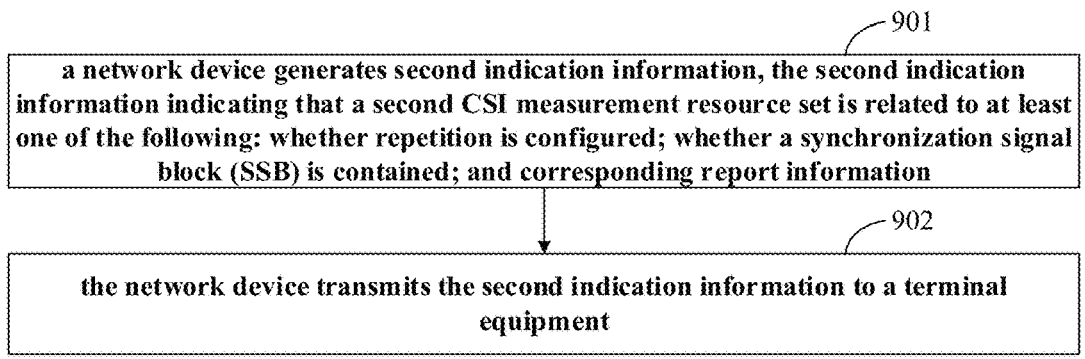
FIG. 9 is a schematic diagram of the method for indicating a measurement purpose of CSI of Embodiment 4.

FIG. 9 is a schematic diagram of the method for indicating a measurement purpose of CSI of this embodiment. As shown in FIG. 9, the method includes:

step 901: a network device generates second indication information, the second indication information indicating that a second CSI measurement resource set is related to at least one of the following: whether repetition is configured; whether a synchronization signal block (SSB) is contained; and corresponding report information;

step 902: the network device transmits the second indication information to a terminal equipment.

In this embodiment, a manner of generating the second indication information is not limited.

With the method of this embodiment, the network device indirectly indicates the measurement purpose of the CSI measurement resource set, thereby avoiding CSI measurement errors due to misunderstanding of the measurement purpose of the CSI measurement resource set by the network device and the terminal equipment.

Embodiment 5

The embodiment of this disclosure provides a method for indicating a resource occupied for CSI calculation, applicable to a terminal equipment. Different from the methods in embodiments 1 and 2 where the measurement purpose of CSI is directly indicated and the methods in embodiments 3 and 4 where the measurement purpose of CSI is indirectly indicated, in this embodiment, according to specific rules, indication information from a base station is interpreted as corresponding resource occupied for CSI calculation. As the purpose of CSI measurement can be different, the resources occupied for CSI calculation can be different, hence, the resource occupied for CSI calculation is a representation of a measurement purpose of CSI (this embodiment is not limited thereto). This embodiment may also be understood as that a terminal equipment directly associates an indication of the base station with the resources occupied for CSI calculation, independent of the measurement purpose of CSI, which is hereby stated.

In embodiments 1-4, after receiving the above indication information (the first indication information or the second indication information), the terminal equipment may determine a measurement purpose of a corresponding CSI measurement resource set. For CSI report or CSI measurement to which CSI measurement resource sets of different measurement purposes correspond, the number and duration of CSI processing units (CPUs in brief) occupied thereby are different. In this embodiment, it may also be understood as that the terminal equipment directly determines the number and duration of CPUs corresponding to the indication information after receiving the above indication information (the first indication information or second indication information).

Figure 10:
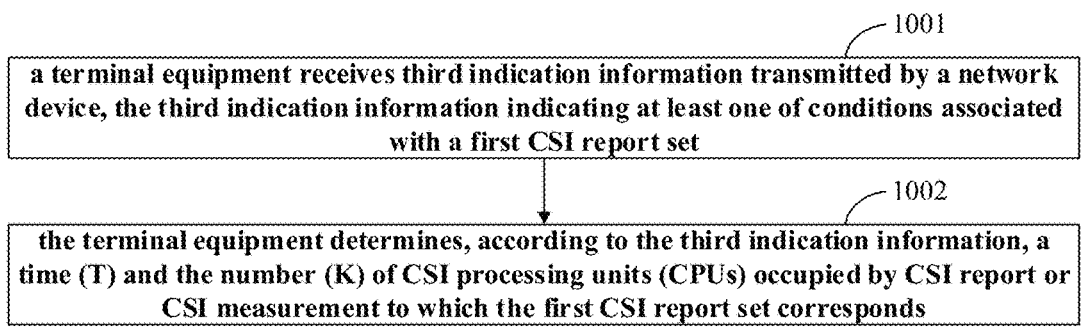
FIG. 10 is a schematic diagram of the method for indicating a resource occupied for CSI calculation of Embodiment 5.

FIG. 10 is a schematic diagram of the method for indicating a resource occupied for CSI calculation of this embodiment. As shown in FIG. 10, the method includes:

step 1001: a terminal equipment receives third indication information transmitted by a network device, the third indication information indicating at least one of conditions associated with a first CSI report set; and step 1002: the terminal equipment determines, according to the third indication information, a time (T) and the number (K) of CSI processing units (CPUs) occupied by CSI report or CSI measurement to which the first CSI report set corresponds.

In this embodiment, the conditions associated with a first CSI report set include: that the first CSI report set needs to perform CSI report, and a content of the CSI report is related to at least one of an L1-SINR, L1-RSRQ and L1-RSRP;

that the first CSI report set needs not to perform CSI report;

that a CSI channel measurement resource set associated with the first CSI report set is not configured with repetition;

that a CSI channel measurement resource set associated with the first CSI report set is configured with repetition;

that a CSI channel measurement resource set associated with the first CSI report set is not used for time-frequency pursuit;

that a CSI channel measurement resource set associated with the first CSI report set is used for time-frequency pursuit;

that a CSI measurement resource set associated with the first CSI report set only includes channel measurement resource(s); and that a CSI measurement resource set associated with the first CSI report set includes channel measurement resource(s) and interference measurement resource(s).

In this embodiment, the terminal equipment determines the time T and the number K of the CPUs occupied by the CSI report or the CSI measurement to which the first CSI report set corresponds according to the conditions associated with the first CSI report set indicated by the third indication information.

In this embodiment, the number K of the CPUs occupied by the CSI report or the CSI measurement to which the first CSI report set corresponds may be at least one of the following: 0; 1; 2; $K_s$; and $N_{CPU}$.

In this embodiment, $K_s$ may be at least one of the following: the number of SSB resources, the number of CSI-RS resources, a maximum value of the number of CSI-RS resources and the number of SSB resources, and a sum of the number of CSI-RS resources and the number of SSB resources.

For example, if the CSI channel measurement resource set with which the first CSI report set is associated only includes the SSBs, $K_s$ is the number of SSB resources; if the CSI channel measurement resource set with which the first CSI report set is associated only includes CSI-RSs, $K_s$ is the number of CSI-RS resources; and if the CSI channel measurement resource set with which the first CSI report set is associated includes CSI-RSs and SSBs, $K_s$ is a maximum value of the number of CSI-RS resources and the number of SSB resources, or $K_s$ is the sum of the number of CSI-RS resources and the number of SSB resources.

In this embodiment, the above $N_{CPU}$ is the number of parallel CPUs supported by the terminal equipment. In this embodiment, the terminal equipment may report its parallel CSI calculation capability $N_{CPU}$ to the network side according to its own capabilities. $N_{CPU}$ refers to the number of CSI processing units (CPUs) used by terminal equipment in CSI report processing in all configured cells. If L CPUs on a given OFDM symbol are occupied to calculate the CSI report, it is deemed that the terminal equipment has $N_{CPU}$-L unoccupied CPUs. Assuming that the number of pieces of CSI report is n=0, 1, ..., N−1, in which the number of CPUs occupied by each pieces CSI report is $O_{CPU}^{(n)}$, if $$\sum_{n=0}^{M-1} O_{CPU}^{(n)} \le N_{CPU} - L$$

is satisfied, where 0≤M≤N, the terminal equipment needs not to report measurement results of N-M pieces of CSI of lowest priorities.

In this embodiment, if the terminal equipment needs to perform CSI report, a time T of a CPU occupied by CSI report corresponding to the first CSI report set may be at least one of the following:

for example, if the CSI report is aperiodic CSI report, time T of the CPU occupied by the CSI report is: from a first or a last symbol after downlink control information (PDCCH) triggering the CSI report to a first or a last symbol of an uplink shared channel (PUSCH) or an uplink control channel (PUCCH) carrying the CSI report.

Figure 11:
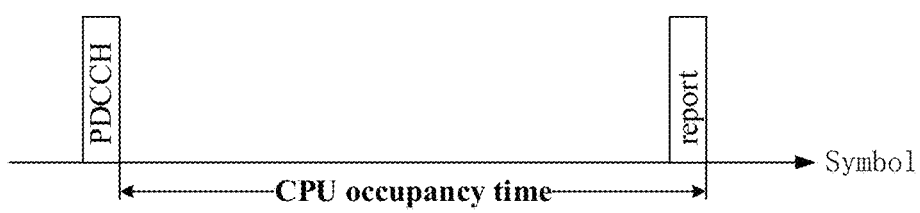
FIGS. 11-19 are schematic diagrams of nine examples of CPU occupancy time.

FIG. 11 shows an example of a time T of a CPU occupied by CSI report in a case of aperiodic CSI report. In this example, the time T is from a first symbol after a PDCCH triggering the CSI report to a last symbol of a PUCCH/PUSCH carrying the CSI report.

For another example, if the CSI report is periodic CSI report, time T of the CPU occupied by the CSI report is: from a first or a last symbol of a CSI measurement occasion related to the CSI report to a first or a last symbol of an uplink shared channel (PUSCH) or an uplink control channel (PUCCH) carrying the CSI report.

The above CSI measurement occasion refers to that there are total Q CSI measurement resources related to the CSI report, measurement occasions where each resource corresponds to a latest measurement occasion for the CSI report and not later than the corresponding CSI reference resource are expressed as a set M={$O_1$, $O_2$, ..., $O_Q$}, an earliest measurement occasion M' is taken from the set M, and M' is the above CSI measurement occasion.

CSI measurement resources to which the above CSI measurement occasion corresponds may be channel measurement resources or interference measurement resources (if there exist interference measurement resources). In particular, they may be CSI-RS resources, or CSI-IM resources, or SSB resources.

Figure 12:
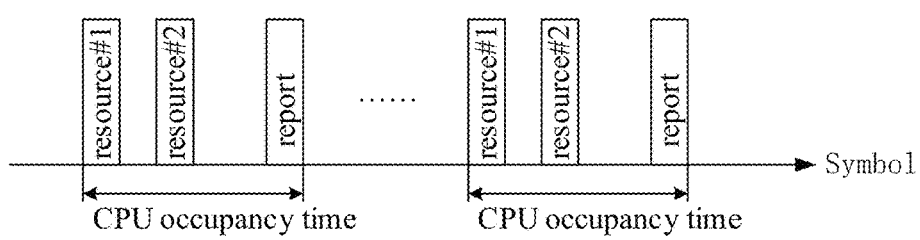

FIG. 12 shows an example of a time T of a CPU occupied by CSI report in a case of periodic CSI report. In this example, the time T is from a first symbol of a CSI measurement occasion to a last symbol of a PUCCH or PUSCH carrying the CSI report.

For a further example, if the above CSI report is semi-persistent CSI report carried by an uplink shared channel (PUSCH) and is initially triggered by downlink control information (PDCCH), the time T of the CPU occupied by the CSI report is: from a first or a last symbol after the downlink control information (PDCCH) triggering the CSI report to a first or a last symbol of the uplink shared channel (PUSCH) carrying the CSI report.

Figure 13:
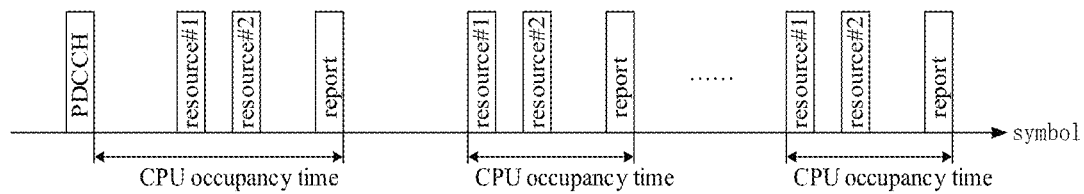

FIG. 13 shows an example of a time T of a CPU occupied by CSI report in a case of semi-persistent CSI report triggered by a PDCCH. In this example, as shown in FIG. 13, for CSI report initially triggered by the PDCCH, the time T is from a first symbol after the PDCCH triggering the CSI report to a last symbol of a PUSCH carrying the CSI report.

For still another example, if the above CSI report is semi-persistent CSI report carried by an uplink shared channel (PUSCH) but is not initially triggered by downlink control information (PDCCH), the time T of the CPU occupied by the CSI report is: from a first or a last symbol of a CSI measurement occasion related to the CSI report to a first or a last symbol of an uplink shared channel (PUSCH) carrying the CSI report. Meanings of the CSI measurement occasion and CSI measurement resources to which the CSI measurement occasion corresponds are identical to those described above, and shall not be described herein any further.

Figure 14:
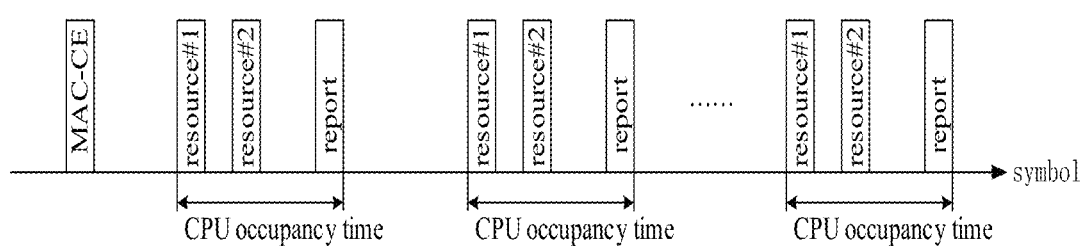

As shown in FIG. 13, a time T of a CPU occupied by other CSI report than the CSI report initially triggered by the PDCCH is from a first symbol of a corresponding CSI measurement occasion (corresponding to the CSI measurement occasion in the above examples) to the last symbol of the PUSCH carrying the CSI report. FIG. 14 shows an example of a time T of a CPU occupied by CSI report in a case of semi-persistent CSI report triggered by an MAC-CE. In this example, a time T of a CPU occupied by the CSI reports is from a first symbol of a corresponding CSI measurement occasion (corresponding to the CSI measurement occasion in the above examples) to the last symbol of the PUSCH carrying the CSI report.

In this embodiment, if the terminal equipment needs not to perform CSI report, the time (T) of CPUs occupied by CSI measurement to which the first CSI report set corresponds (i.e. CPUs occupied by calculating the CSI measurement) may be at least one of the following.

For example, if a time domain behavior to which the CSI report set corresponds is aperiodic, the time (T) of CPUs occupied by the CSI measurement to which the CSI report set corresponds is: from a first or a last symbol after the downlink control information (PDCCH) triggering the CSI report set to a maximum value of x+$Z_0$ and y+$Z_1$.

The above x is the first or last symbol after the downlink control information (PDCCH) triggering the CSI report set, the above $Z_0$ is a CSI calculation time related to the CSI measurement or report triggered by the control information, the above y is a last symbol of a latest CSI channel measurement resource or interference measurement resource related to the CSI report set, and the above $Z_1$ is a CSI calculation time related to the CSI measurement resource.

The above $Z_0$ is related to a subcarrier spacing, and/or is related to a calculation purpose and/or a reported content (L1-RSRP, L1-SINR, L1-RSRQ) corresponding to the above CSI report set; for example, when the calculation purpose is L1-RSRP, for a value of $Z_0$, when a subcarrier spacing is 15 kHz, $Z_0$=22 symbols; when a subcarrier spacing is 30 kHz, $Z_0$=33 symbols; when a subcarrier spacing is 60 kHz, $Z_0$=min(44, $Z_1$+KB1) symbols; and when a subcarrier spacing is 120 kHz, $Z_0$=min(97, $Z_1$+KB2) symbols; wherein KB1 and KB2 are related to an ability of the terminal equipment to report to the network side. The ability refers to a time needed by the terminal equipment in receiving a PDCCH and applying space (QCL) information indicated by the PDCCH to receive a corresponding PDSCH. For example, at 60 kHz, KB1={7,14,28}; and at 120 kHz, KB2={14,28}. When the calculation purpose is for L1-SINR, a value of $Z_0$ is greater than a value of $Z_0$ (when the calculation purpose is for L1-RSRP or L1-RSRQ). This is because that a calculation complexity of L1-SINR is higher than that of L1-RSRP or L1-RSRQ, and a longer CSI calculation time is needed.

The above $Z_1$ is related to an ability of the terminal equipment to report to the network side. The ability refers to that the terminal equipment reports different report processing times related to the CSI calculation for beam management to the network side according to different subcarrier spacings. The processing times related to the CSI calculation for beam management may refer to being related a calculation purpose (L1-RSRP, L1-SINR, L1-RSRQ) corresponding to the above CSI report set.

The above channel measurement resources or interference measurement resources may be used for L1-SINR measurement, for example, they may be one of a CSI-RS, an SSB, and a CSI-IM. furthermore, periods of the above channel measurement resources and interference measurement resources (if there exist interference measurement resources) used for the L1-SINR measurement may be identical. An advantage that the periods of these resources are identical is that fairness and accuracy of results of joint estimation by channel measurement and interference measurement may be ensured.

Figure 15:
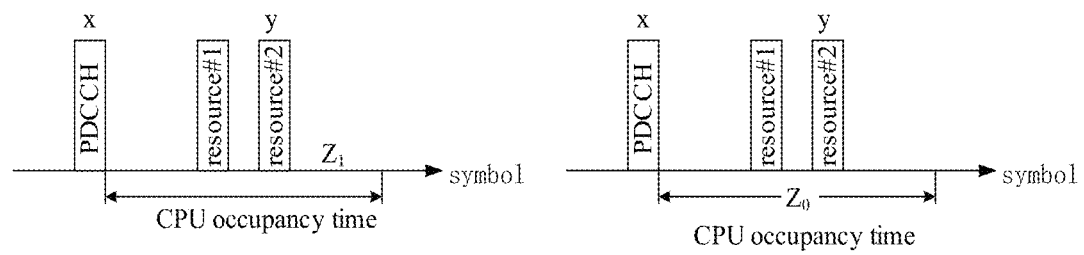

FIG. 15 shows two examples of a time T of a CPU occupied by corresponding CSI measurement in a case where a CSI report set is aperiodic. As shown on the left side of FIG. 15, $x+Z_0<y+Z_1$, and the time T of the CPU occupied by the corresponding CSI measurement is a first symbol after a PDCCH triggering the CSI report to $y+Z_1$; as shown on the right side of FIG. 15, $x+Z_0>y+Z_1$, and the time T of the CPU occupied by the corresponding CSI measurement is a first symbol after a PDCCH triggering the CSI report to $x+Z_0$.

For another example, if the time domain behavior corresponding to the above CSI report set is periodic, the time (T) of the CPU occupied by the CSI measurement corresponding to the CSI report set is: from a first symbol of an earliest measurement occasion in measurement occasions of the CSI measurement resources associated with the CSI report set in a transmission occasion associated with the CSI report set to $y'+Z_1$. A meaning of $Z_1$ is identical to what is described above, and y' is a last symbol of a latest measurement occasion in transmission occasions of the CSI measurement resources related to the CSI report set in the above transmission occasions. The above CSI measurement resources may be resources used for CSI channel measurement, and may also be resources used for interference measurement.

Figure 16:
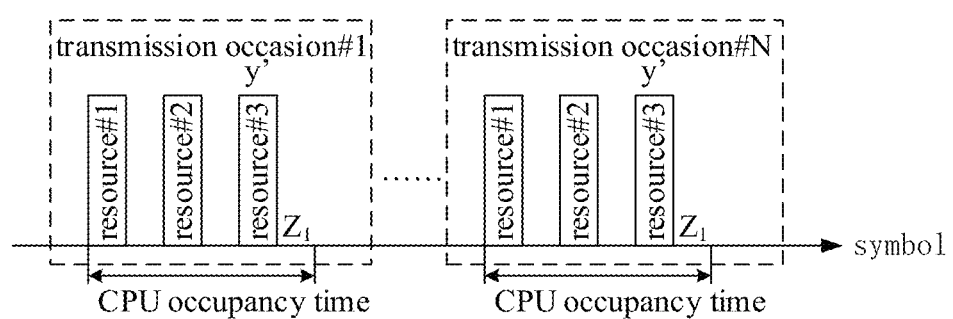

FIG. 16 shows an example of a time T of a CPU occupied by CSI measurement in a case where a CSI report set is periodic. As shown in FIG. 16, in transmission occasion #1 or transmission occasion #N, the CPU occupancy time is from resource #1 to resource #3+$Z_1$, resource #1 is (the first symbol of) the above earliest measurement occasion, and resource #3 is (the first or last symbol of) the above latest measurement occasion.

For another example, if the time domain behavior corresponding to the above CSI report set is semi-persistent, and initial CSI measurement corresponding to the CSI report set is triggered by downlink control information (PDCCH), for the CSI measurement, the time (T) of the CPU it occupies is from a first symbol after the downlink control information (PDCCH) triggering the CSI report set to a maximum value of $x+Z_0$ and $y+Z_1$. Meanings of x, $Z_0$, y and $Z_1$ are identical to what is described above.

Figure 17:
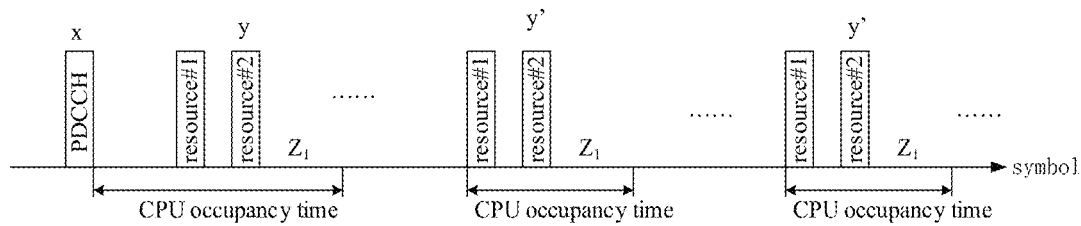
Figure 18:
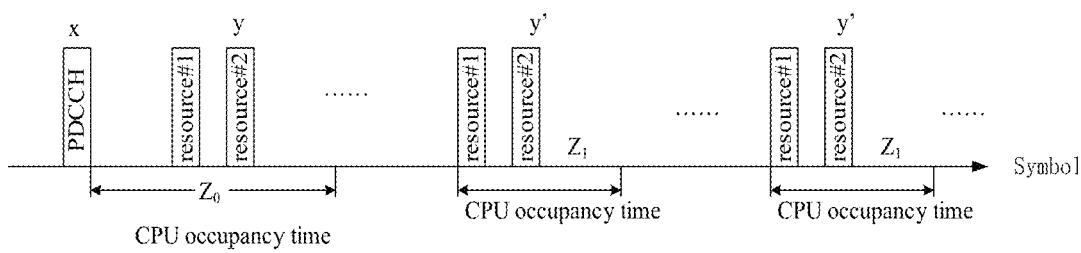

FIGS. 17 and 18 show two examples of a time T occupied by CSI measurement corresponding to the CSI report set in a case of a semi-persistent CSI report set triggered by a PDCCH. In the example of FIG. 17, $x+Z_0<y+Z_1$, for CSI measurement initially triggered by the PDCCH, the time T of the CPU occupied by the CSI measurement is a first symbol after the PDCCH triggering the CSI measurement to $y+Z_1$; and in the example in FIG. 18, $x+Z_0>y+Z_1$, the time T of the CPU occupied by the CSI measurement is a first symbol after the PDCCH triggering the CSI report to $x+Z_0$.

For another example, if the time domain behavior corresponding to the above CSI report set is semi-persistent, a time (T) of a CPU occupied by CSI measurement to which the CSI report corresponds other than CSI measurement initially triggered by a PDCCH is: from a first symbol of an earliest measurement occasion in measurement occasions of the CSI measurement resources related to the CSI report set to $y'+Z_1$. Meanings of y' and $Z_1$ are identical to what is described above. The above CSI measurement resources may be resources used for CSI channel measurement, and may also be resources used for interference measurement.

Figure 19:
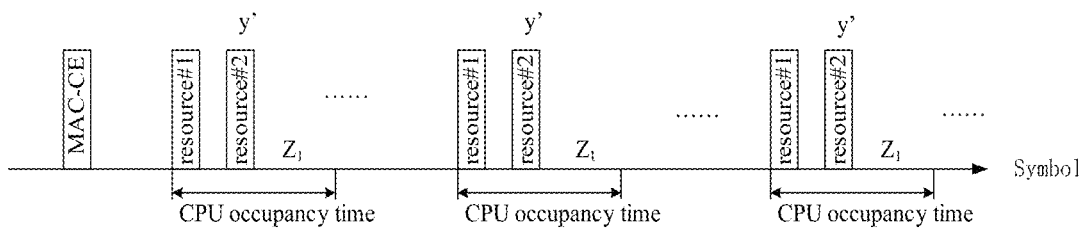

FIG. 19 shows an example of a time T of a CPU occupied by CSI measurement to which a CSI report set corresponds in a case of semi-persistent CSI report triggered by an MAC-CE. In this example, as shown in FIG. 19, for each transmission occasion, the CPU occupancy time T is from resource #1 to resource #2+$Z_1$, resource #1 is (the first symbol of) the above earliest measurement occasion, and resource #2 is (the first symbol of) the above latest measurement occasion. As shown in FIGS. 17 and 18, the CPU occupancy time T for each of other transmission occasions than the transmission occasion (a first transmission occasion) to which related CSI measurement initially triggered by a PDCCH corresponds is from resource #1 to resource #2+$Z_1$, resource #1 is (the first symbol of) the earliest transmission occasion in the other transmission occasions, and resource #2 is (the last symbol of) the latest measurement occasion in the other transmission occasions.

In an example, the terminal equipment receives signaling (such as RRC signaling) from a network device. The signaling indicates that the above CSI report set needs to perform CSI report and a content of the CSI report is related to L1-SINR measurement, then the CSI report to which the CSI report set corresponds occupies K CPUs, and a corresponding occupancy time is the occupancy time T in the case where the terminal equipment needs to perform CSI report described above, examples of which being as shown in FIGS. 11-14.

In another example, the terminal equipment receives signaling (such as RRC signaling) from the network device. The signaling indicates that the above CSI report set need not to perform CSI report, and a channel measurement set to which the CSI report set corresponds is not used for time-frequency pursuit ("trs-info" is not configured), and the CSI measurement resource set with which the CSI report set is associated includes only a channel measurement resource set (not including an interference measurement resource set), then the CSI measurement to which the CSI report set corresponds occupies K CPUs, and a corresponding occupancy time is the occupancy time T in the case where the terminal equipment does not need to perform CSI report described above, examples of which being as shown in FIGS. 15-19.

In a further example, the terminal equipment receives signaling (such as RRC signaling) from the network device. The signaling indicates that the above CSI report set need not to perform CSI report, and a channel measurement set to which the CSI report set corresponds is not used for time-frequency pursuit ("trs-info" is not configured), and the CSI measurement resource set with which the CSI report set is associated includes not only a channel measurement resource set but also an interference measurement resource set, then the CSI measurement to which the CSI report set corresponds occupies K CPUs, and a corresponding occupancy time is the occupancy time T in the case where the terminal equipment does not need to perform CSI report described above, examples of which being as shown in FIGS. 15-19.

In still another example, the terminal equipment receives signaling (such as RRC signaling) from the network device. The signaling indicates that the above CSI report set needs to perform CSI report and a channel measurement set to which the CSI report set corresponds is configured with "repetition", then the CSI report to which the CSI report set corresponds occupies K CPUs, and a corresponding occupancy time is the occupancy time T in the case where the terminal equipment needs to perform CSI report described above, examples of which being as shown in FIGS. 11-14.

In yet another example, the terminal equipment receives signaling (such as RRC signaling) from the network device. The signaling indicates that the above CSI report set does not need to perform CSI report and a channel measurement set to which the CSI report set corresponds is configured with "repetition", then the CSI measurement to which the CSI report set corresponds occupies K CPUs, and a corresponding occupancy time is the occupancy time T in the case where the terminal equipment does not need to perform CSI report described above, examples of which being as shown in FIGS. 15-19.

In yet still another example, the terminal equipment receives signaling (such as RRC signaling) from the network device. The signaling indicates that the above CSI report set needs to perform CSI report and a channel measurement set to which the CSI report set corresponds is not configured with "repetition" and is not used for time-frequency pursuit ("trs-info" is not configured), then the CSI report to which the CSI report set corresponds occupies K CPUs, and a corresponding occupancy time is the occupancy time T in the case where the terminal equipment needs to perform CSI report described above, examples of which being as shown in FIGS. 11-14.

In yet further still another example, the terminal equipment receives signaling (such as RRC signaling) from the network device. The signaling indicates that the above CSI report set does not need to perform CSI report and a channel measurement set to which the CSI report set corresponds is not configured with "repetition" and is not used for time-frequency pursuit ("trs-info" is not configured), then the CSI measurement to which the CSI report set corresponds occupies K CPUs, and a corresponding occupancy time is the occupancy time T in the case where the terminal equipment does not need to perform CSI report described above, examples of which being as shown in FIGS. 15-19.

With the method of this embodiment, the network device indicates the conditions related to the CSI measurement resource set, thereby avoiding CSI measurement errors due to misunderstanding of the measurement purpose of the CSI measurement resource set by the network device and the terminal equipment.

Embodiment 6

The embodiment provides a method for indicating a resource occupied for CSI calculation, applicable to a network device. This method is processing at a network device side corresponding to the method of Embodiment 5, with contents identical to those in Embodiment 5 being not going to be described herein any further.

Figure 20:
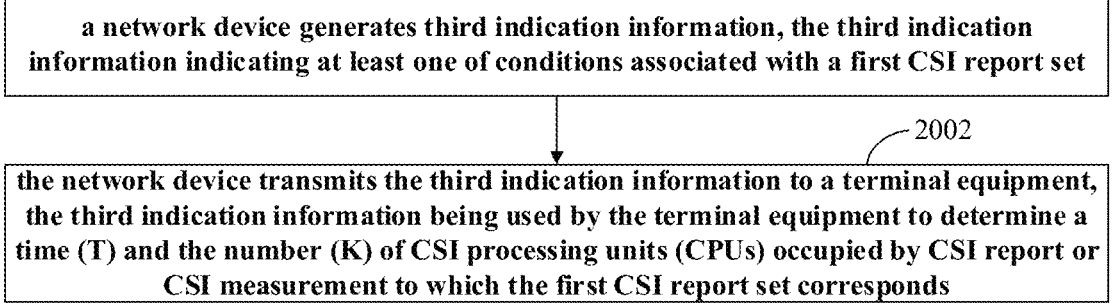
FIG. 20 is a schematic diagram of the method for indicating a resource occupied for CSI calculation of Embodiment 6.

FIG. 20 is a schematic diagram of the method for indicating a resource occupied for CSI calculation of this embodiment. As shown in FIG. 20, the method includes:

step 2001: a network device generates third indication information, the third indication information indicating at least one of conditions associated with a first CSI report set; and step 2002: the network device transmits the third indication information to a terminal equipment, the third indication information being used by the terminal equipment to determine a time (T) and the number (K) of CSI processing units (CPUs) occupied by CSI report or CSI measurement to which the first CSI report set corresponds.

In this embodiment, a manner of generating the third indication information is not limited.

With the method of this embodiment, the network device indicates the conditions related to the CSI measurement resource set, thereby avoiding CSI measurement errors due to misunderstanding of the measurement purpose of the CSI measurement resource set by the network device and the terminal equipment.

Embodiment 7

This embodiment provides an apparatus for indicating a measurement purpose of channel state information, configured in a terminal equipment. As principles of the apparatus for solving problems are similar to that of the method in Embodiment 1, reference may be made to the implementation of the method in Embodiment 1 for implementation of this apparatus, with identical contents being not going to be described herein any further.

Figure 21:
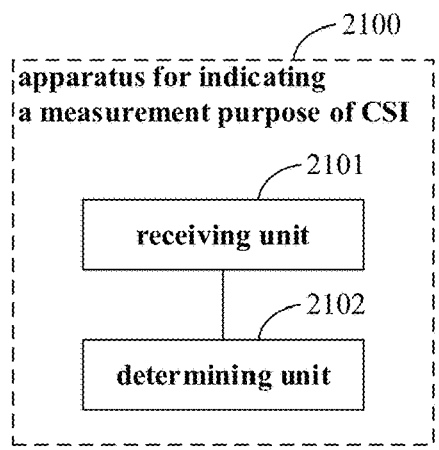
FIG. 21 is a schematic diagram of the apparatus for indicating a measurement purpose of CSI of Embodiment 7.

FIG. 21 is a schematic diagram of an apparatus 2100 for indicating a measurement purpose of CSI of this embodiment. As shown in FIG. 21, the apparatus 2100 includes:

a receiving unit 2101 configured to receive first indication information transmitted by a network device, the first indication information indicating a measurement purpose of a first channel state information (CSI) measurement resource set; and a determining unit 2102 configured to determine the measurement purpose of the first CSI measurement resource set according to the first indication information.

With the apparatus of this embodiment, the network device indicates directly the measurement purpose of the CSI measurement resource set, thereby avoiding CSI measurement errors due to misunderstanding of the measurement purpose of the CSI measurement resource set by the network device and the terminal equipment.

Embodiment 8

This embodiment provides an apparatus for indicating a measurement purpose of CSI, configured in a network device. As principle of the apparatus for solving problems are similar to that of the method in Embodiment 2, reference may be made to the implementation of the method in Embodiment 2 for implementation of this apparatus, with identical contents being not going to be described herein any further.

Figure 22:
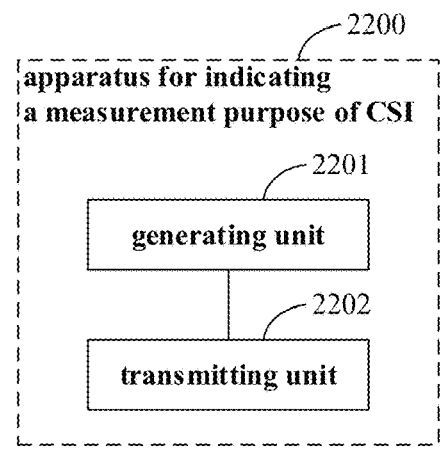
FIG. 22 is a schematic diagram of the apparatus for indicating a measurement purpose of CSI of Embodiment 8.

FIG. 22 is a schematic diagram of an apparatus 2200 for indicating a measurement purpose of CSI of this embodiment. As shown in FIG. 22, the apparatus 2200 includes:

a generating unit 2201 configured to generate first indication information, the first indication information indicating a measurement purpose of a first CSI measurement resource set; and a transmitting unit 2202 configured to transmit the first indication information to a terminal equipment.

With the apparatus of this embodiment, the network device directly indicates the measurement purpose of the CSI measurement resource set, thereby avoiding CSI measurement errors due to misunderstanding of the measurement purpose of the CSI measurement resource set by the network device and the terminal equipment.

Embodiment 9

This embodiment provides an apparatus for indicating a measurement purpose of CSI, configured in a terminal equipment. As principles of the apparatus for solving problems are similar to that of the method in Embodiment 3, reference may be made to the implementation of the method in Embodiment 3 for implementation of this apparatus, with identical contents being not going to be described herein any further.

Figure 23:
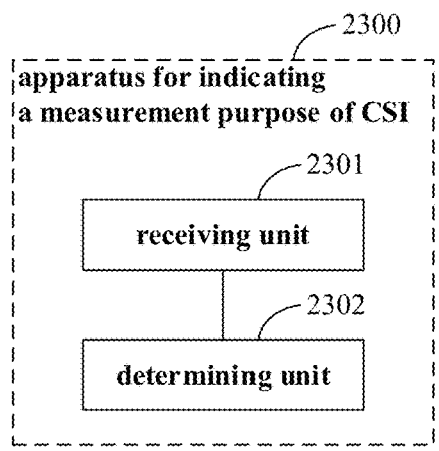
FIG. 23 is a schematic diagram of the apparatus for indicating a measurement purpose of CSI of Embodiment 9.

FIG. 23 is a schematic diagram of an apparatus 2300 for indicating a measurement purpose of CSI of this embodiment. As shown in FIG. 23, the apparatus 2300 includes:

a receiving unit 2301 configured to receive second indication information transmitted by a network device, the second indication information indicating that a second channel state information (CSI) measurement resource set is related to at least one of the following: whether repetition is configured; whether a synchronization signal block (SSB) is contained; and corresponding report information;

a determining unit 2302 configured to determine a measurement purpose of the second CSI measurement resource set according to the second indication information.

With the apparatus of this embodiment, the network device indirectly indicates the measurement purpose of the CSI measurement resource set, thereby avoiding CSI measurement errors due to misunderstanding of the measurement purpose of the CSI measurement resource set by the network device and the terminal equipment.

Embodiment 10

This embodiment provides an apparatus for indicating a measurement purpose of CSI, configured in a network device. As principles of the apparatus for solving problems are similar to that of the method in Embodiment 4, reference may be made to the implementation of the method in Embodiment 4 for implementation of this apparatus, with identical contents being not going to be described herein any further.

Figure 24:
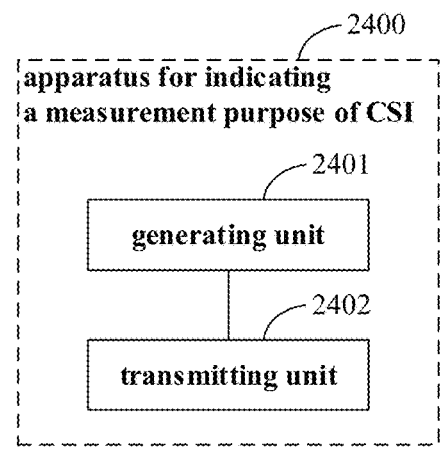
FIG. 24 is a schematic diagram of the apparatus for indicating a measurement purpose of CSI of Embodiment 10.

FIG. 24 is a schematic diagram of an apparatus 2400 for indicating a measurement purpose of CSI of this embodiment. As shown in FIG. 24, the apparatus 2400 includes:

a generating unit 2401 configured to generate second indication information, the second indication information indicating that a second CSI measurement resource set is related to at least one of the following: whether repetition is configured; whether a synchronization signal block (SSB) is contained; and corresponding report information;

a transmitting unit 2402 configured to transmit the second indication information to a terminal equipment.

With the apparatus of this embodiment, the network device indirectly indicates the measurement purpose of the CSI measurement resource set, thereby avoiding CSI measurement errors due to misunderstanding of the measurement purpose of the CSI measurement resource set by the network device and the terminal equipment.

Embodiment 11

This embodiment provides an apparatus for indicating a resource occupied for CSI calculation, configured in a terminal equipment. As principle of the apparatus for solving problems are similar to that of the method in Embodiment 5, reference may be made to the implementation of the method in Embodiment 5 for implementation of this apparatus, with identical contents being not going to be described herein any further.

Figure 25:
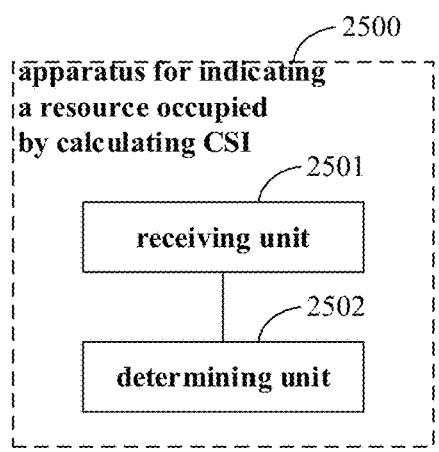
FIG. 25 is a schematic diagram of the apparatus for indicating a resource occupied for CSI calculation of Embodiment 11.

FIG. 25 is a schematic diagram of an apparatus 2500 for indicating a resource occupied for CSI calculation of this embodiment. As shown in FIG. 25, the apparatus 2500 includes:

a receiving unit 2501 configured to receive third indication information transmitted by a network device, the third indication information indicating at least one of the conditions (described in Embodiment 5) associated with a first CSI report set; and a determining unit 2502 configured to, according to the third indication information, determine a time (T) and the number (K) of CSI processing units (CPUs) occupied by CSI report or CSI measurement to which the first CSI report set corresponds.

With the apparatus of this embodiment, the network device indicates the conditions related to the CSI measurement resource set, thereby avoiding CSI measurement errors due to misunderstanding of the measurement purpose of the CSI measurement resource set by the network device and the terminal equipment.

Embodiment 12

This embodiment provides an apparatus for indicating a resource occupied for CSI calculation, configured in a network device. As principles of the apparatus for solving problems are similar to that of the method in Embodiment 6, reference may be made to the implementation of the method in Embodiment 6 for implementation of this apparatus, with identical contents being not going to be described herein any further.

Figure 26:
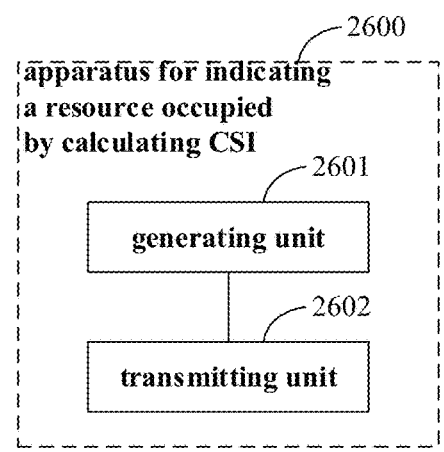
FIG. 26 is a schematic diagram of the apparatus for indicating a resource occupied for CSI calculation of Embodiment 12.

FIG. 26 is a schematic diagram of an apparatus 2600 for indicating a resource occupied for CSI calculation of this embodiment. As shown in FIG. 26, the apparatus 2600 includes:

a generating unit 2601 configured to generate third indication information, the third indication information indicating at least one of the conditions (described in Embodiment 5) associated with a first CSI report set; and a transmitting unit 2602 configured to transmit the third indication information to a terminal equipment, the third indication information being used by the terminal equipment to determine a time (T) and the number (K) of CSI processing units (CPUs) occupied by CSI report or CSI measurement to which the first CSI report set corresponds.

With the apparatus of this embodiment, the network device indicates the conditions related to the CSI measurement resource set, thereby avoiding CSI measurement errors due to misunderstanding of the measurement purpose of the CSI measurement resource set by the network device and the terminal equipment.

Embodiment 13

This embodiment provides a terminal equipment, including the apparatus described in Embodiment 3 or 7 or 11.

Figure 27:
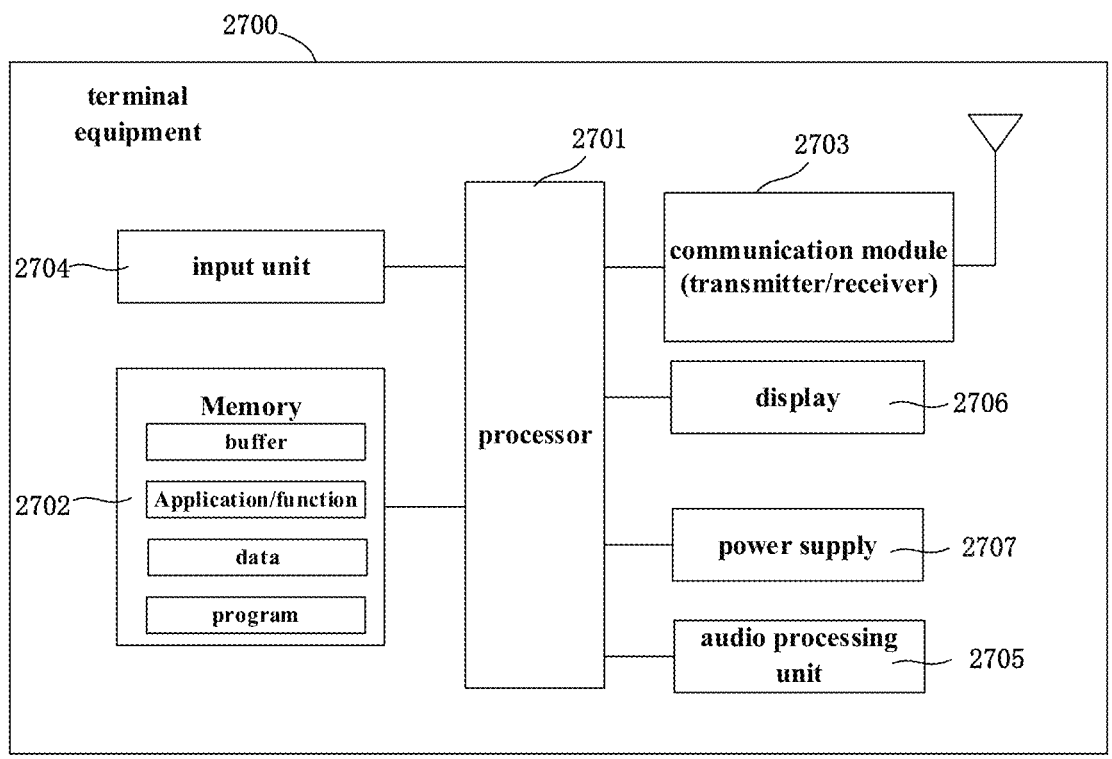
FIG. 27 is a schematic diagram of the terminal equipment of Embodiment 13.

FIG. 27 is a schematic diagram of the terminal equipment of the embodiment of this disclosure. As shown in FIG. 27, a terminal equipment 2700 may include a central processing unit 2701 and a memory 2702, the memory 2702 being coupled to the central processing unit 2701. It should be noted that this figure is illustrative only, and other types of structures may also be used, so as to supplement or replace this structure and achieve a telecommunications function or other functions.

In one implementation, the functions of the apparatus described in Embodiment 3 or 7 or 11 may be integrated into the central processing unit 2701, and the central processing unit 2701 achieves the functions of the apparatus described in Embodiment 3 or 7 or 11. The functions of the apparatus described in Embodiment 3 or 7 or 11 are incorporated herein, and shall not be described herein any further.

In another implementation, the apparatus described in Embodiment 3 or 7 or 11 and the central processing unit 2701 may be configured separately; for example, the apparatus described in Embodiment 3 or 7 or 11 may be configured as a chip connected to the central processing unit 2701, and the functions of the apparatus described in Embodiment 3 or 7 or 11 are executed under control of the central processing unit 2701.

As shown in FIG. 27, the terminal equipment 2700 may further include a communication module 2703, an input unit 2704, an audio processing unit 2705, a display 2706, and a power supply 2707, etc. It should be noted that the terminal equipment 2700 does not necessarily include all the parts shown in FIG. 27. Furthermore, the terminal equipment 2700 may include parts not shown in FIG. 27, and the related art may be referred to.

As shown in FIG. 27, the central processing unit 2701 is sometimes referred to as a controller or an operational control, which may include a microprocessor or other processor devices and/or logic devices. The central processing unit 2701 receives input and controls operations of components of the terminal equipment 2700.

The memory 2702 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 2701 may execute programs stored in the memory 2702, so as to realize information storage or processing, etc. Functions of other parts are similar to those of the related art, which shall not be described herein any further. The parts of the terminal equipment 2700 may be realized by specific hardware, firmware, software, or any combination thereof, without departing from the scope of this disclosure.

With the terminal equipment of this embodiment, CSI measurement errors due to misunderstanding of the measurement purpose of the CSI measurement resource set by the network device and the terminal equipment may be avoided.

Embodiment 14

The embodiment of this disclosure provides a network device, including the apparatus described in Embodiment 4 or 8 or 12.

Figure 28:
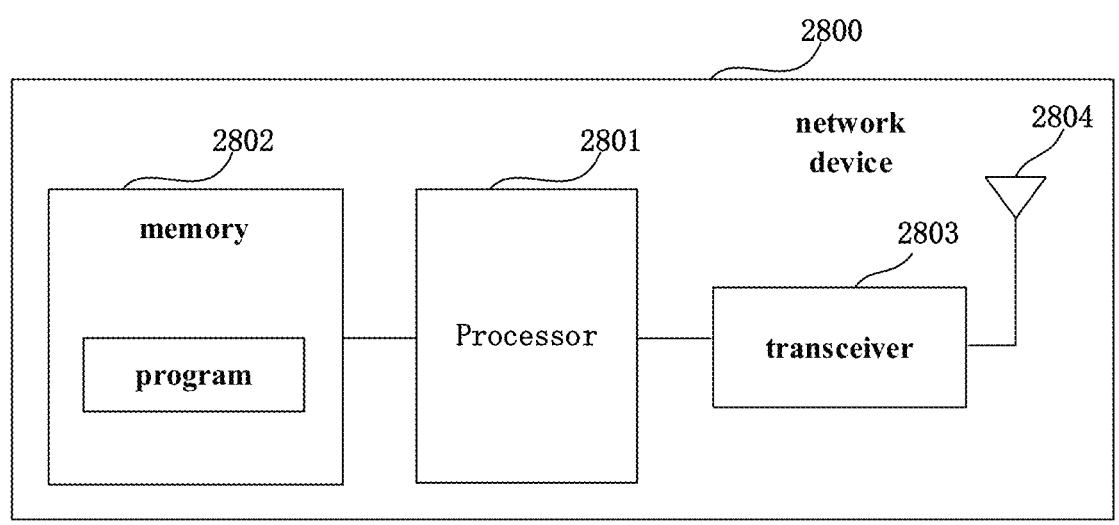
FIG. 28 is a schematic diagram of the network device of Embodiment 14.

FIG. 28 is a schematic diagram of a structure of one implementation of the network device of the embodiment of this disclosure. As shown in FIG. 28, a network device 2800 may include a central processing unit (CPU) 2801 and a memory 2802, the memory 2802 being coupled to the central processing unit 2801. The memory 2802 may store various data, and furthermore, it may store a program for data processing, and execute the program under control of the central processing unit 2801, so as to receive various information transmitted by a terminal equipment, and transmit various information to the terminal equipment.

In one implementation, the functions of the apparatus described in Embodiment 4 or 8 or 12 may be integrated into the central processing unit 2801, and the central processing unit 2801 achieves the functions of the apparatus described in Embodiment 4 or 8 or 12. The functions of the apparatus described in Embodiment 4 or 8 or 12 are incorporated herein, and shall not be described herein any further.

In another implementation, the apparatus described in Embodiment 4 or 8 or 12 and the central processing unit 2801 may be configured separately; for example, the apparatus described in Embodiment 4 or 8 or 12 may be configured as a chip connected to the central processing unit 2801, and the functions of the apparatus described in Embodiment 4 or 8 or 12 are executed under control of the central processing unit 2801.

Furthermore, as shown in FIG. 28, the network device 2800 may include a transceiver 2803, and an antenna 2804, etc. Functions of the above components are similar to those in the related art, and shall not be described herein any further. It should be noted that the network device 2800 does not necessarily include all the parts shown in FIG. 28. Furthermore, the network device 2800 may include parts not shown in FIG. 28, and the related art may be referred to.

With the network device of this embodiment, CSI measurement errors due to misunderstanding of the measurement purpose of the CSI measurement resource set by the network device and the terminal equipment may be avoided.

Embodiment 15

The embodiment of this disclosure provides a communication system, including a network device and a terminal equipment. The network device is, for example, the network device 2800 described in Embodiment 14, and the terminal equipment is, for example, the terminal equipment 2700 described in Embodiment 13.

In this embodiment, the terminal equipment is, for example, a UE served by a gNB, and may include conventional compositions and functions of a terminal equipment in addition to the functions of the apparatus described in Embodiment 3 or 7 or 11, which are as described in Embodiment 13, and shall not be described herein any further.

In this embodiment, the network device may be, for example, a gNB in NR, and may include conventional compositions and functions of a network device in addition to the functions of the apparatus described in Embodiment 4 or 8 or 12, which are as described in Embodiment 14, and shall not be described herein any further.

With the communication system of this embodiment, CSI measurement errors due to misunderstanding of the measurement purpose of the CSI measurement resource set by the network device and the terminal equipment may be avoided.

An embodiment of this disclosure provides a computer readable program, which, when executed in a terminal equipment, will cause a computer to carry out the method described in Embodiment 1 or 5 or 9 in the terminal equipment.

An embodiment of this disclosure provides a storage medium storing a computer readable program, which will cause a computer to carry out the method described in Embodiment 1 or 5 or 9 in a terminal equipment.

An embodiment of this disclosure provides a computer readable program, which, when executed in a network device, will cause a computer to carry out the method described in Embodiment 2 or 6 or 10 in the network device.

An embodiment of this disclosure provides a storage medium storing a computer readable program code, which will cause a computer to carry out the method described in Embodiment 2 or 6 or 10 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

1. An apparatus for indicating a measurement purpose of channel state information, configured in a terminal equipment, the apparatus including:

a receiving unit configured to receive first indication information transmitted by a network device, the first indication information indicating a measurement purpose of a first channel state information (CSI) measurement resource set; and a determining unit configured to determine the measurement purpose of the first CSI measurement resource set according to the first indication information.

2. An apparatus for indicating a measurement purpose of channel state information, configured in a network device, the apparatus including:

a generating unit configured to generate first indication information, the first indication information indicating a measurement purpose of a first CSI measurement resource set; and a transmitting unit configured to transmit the first indication information to a terminal equipment.

3. The apparatus according to supplement 1 or 2, wherein the measurement purpose of the first CSI measurement resource set is identical to a measurement purpose of a second CSI measurement resource set of the terminal equipment, and the first CSI measurement resource set is related to the second CSI measurement resource set.

4. The apparatus according to any one of supplements 1-3, wherein at least one CSI measurement resource in the first CSI measurement resource set is used to perform measurement of at least one of the following:

channel measurement;

interference measurement;

interference measurement of a CSI reference signal based on zero power; and interference measurement of a CSI reference signal based on non-zero power.

5. The apparatus according to any one of supplements 1-3, wherein the first CSI measurement resource set is any one of the following that:

a set including only one reference signal resource;

a set including one or more reference signal resources and corresponding to one CSI measurement resource set; and a set including one or more reference signal resources and corresponding to one or more CSI measurement resource sets.

6. The apparatus according to supplement 5, wherein the one or more CSI measurement resource sets are associated with one CSI report set.

7. The apparatus according to any one of supplements 1-3, wherein the first CSI measurement resource set includes at least one of the following reference signal resources:

a synchronization signal block (SSB);

a channel state information reference signal (CSI-RS); and a channel state information interference measurement (CSI-IM).

8. The apparatus according to supplement 3, wherein the second CSI measurement resource set is identical to the first CSI measurement resource set, or a CSI report set with which the second CSI measurement resource set is associated is identical to a CSI report set with which the first CSI measurement resource set is associated.

9. The apparatus according to any one of supplements 1-8, wherein the measurement purpose is channel measurement and/or interference measurement.

10. The apparatus according to supplement 9, wherein the channel measurement refers to at least one of the following:

channel measurement used for beam management;

channel measurement used for CSI acquisition; and channel measurement uses for time-frequency pursuit.

11. The apparatus according to supplement 10, wherein the channel measurement used for beam management includes at least one of the following:

channel measurement used for L1-RSRP calculation;

channel measurement used for L1-RSRQ calculation; and channel measurement used for L1-SINR calculation.

1A. An apparatus for indicating a measurement purpose of channel state information, configured in a terminal equipment, the apparatus including:

a receiving unit configured to receive second indication information transmitted by a network device, the second indication information indicating that a second channel state information (CSI) measurement resource set is related to at least one of the following:

whether repetition is configured;

whether a synchronization signal block (SSB) is contained; and corresponding report information;

a determining unit configured to determine a measurement purpose of the second CSI measurement resource set according to the second indication information.

2A. An apparatus for indicating a measurement purpose of channel state information, configured in a network device, the apparatus including:

a generating unit configured to generate second indication information, the second indication information indicating that a second CSI measurement resource set is related to at least one of the following: whether repetition is configured; whether a synchronization signal block (SSB) is contained; and corresponding report information;

a transmitting unit configured to transmit the second indication information to a terminal equipment.

3A. The apparatus according to supplement 1A or 2A, wherein in a CSI measurement resource set used for channel measurement and associated with a CSI report set to which the second CSI measurement resource set corresponds, if the repetition is configured, the measurement purpose of the second CSI measurement resource set is channel measurement used for beam management.

4A. The apparatus according to supplement 1A or 2A, wherein in a CSI measurement resource set used for channel measurement and associated with a CSI report set to which the second CSI measurement resource set corresponds, if the SSB is contained, the measurement purpose of the second CSI measurement resource set is channel measurement used for beam management, and the second CSI measurement resource set includes at least one of the following:

the CSI measurement resource used for channel measurement; and the CSI measurement resource used for channel measurement and an interference measurement resource related to the CSI measurement resource used for channel measurement.

5A. The apparatus according to supplement 1A or 2A, wherein if a CSI measurement resource used for channel measurement in the second CSI measurement resource set includes at least one CSI-RS set and the CSI-RS set is configured with the repetition, the measurement purpose of the second CSI measurement resource set is channel measurement used for beam management, and the second CSI measurement resource set includes at least one of the following:

the CSI measurement resource used for channel measurement; and the CSI measurement resource used for channel measurement and an interference measurement resource related to the CSI measurement resource used for channel measurement.

6A. The apparatus according to supplement 1A or 2A, wherein if report information to which a CSI measurement resource used for channel measurement in the second CSI measurement resource set corresponds is related to at least one of L1-RSRP, L1-RSRQ and an L1-SINR, the measurement purpose of the second CSI measurement resource set is channel measurement used for beam management, and the second CSI measurement resource set includes at least one of the following:

the CSI measurement resource used for channel measurement; and the CSI measurement resource used for channel measurement and an interference measurement resource related to the CSI measurement resource used for channel measurement.

7A. The apparatus according to any one of supplements 3A-6A, wherein the channel measurement used for beam management includes at least one of the following:

channel measurement used for calculation of the L1-RSRP;

channel measurement used for calculation of the L1-RSRQ; and channel measurement used for calculation of the L1-SINR.

8A. The apparatus according to supplement 1A or 2A, wherein if the CSI measurement resources used for channel measurement in the second CSI measurement resource set include at least one CSI-RS set and the CSI-RS set is not configured with repetition, the measurement purpose of the second CSI measurement resource set is CSI acquisition or time-frequency pursuit, and the second CSI measurement resource set includes at least one of the following:

CSI measurement resources used for channel measurement; and the CSI measurement resources used for channel measurement and interference measurement resources related to the CSI measurement resources used for channel measurement.

9A. The apparatus according to supplement 1A or 2A, wherein if the report information to which a CSI measurement resources used for channel measurement in the second CSI measurement resource set corresponds is related to at least one of a CQI, a PMI, an RI and L1, the measurement purpose of the second CSI measurement resource set is CSI acquisition or time-frequency pursuit, and the second CSI measurement resource set includes at least one of the following:

CSI measurement resources used for channel measurement; and the CSI measurement resources used for channel measurement and interference measurement resources related to the CSI measurement resources used for channel measurement.

10A. The apparatus according to supplement 1A or 2A, wherein the measurement purpose of measurement of the second CSI measurement resource set is for L1-RSRP or L1-RSRQ measurement if at least one of the following conditions is satisfied:

report information corresponding to a CSI measurement resource set used for channel measurement in the second CSI measurement resource set being related to no report;

a CSI measurement resource set used for channel measurement in the second CSI measurement resource set being not used for time-frequency pursuit; and a CSI report set corresponding to the second CSI measurement resource set being only associated with CSI measurement resources used for channel measurement.

11A. The apparatus according to supplement 1A or 2A, wherein the measurement purpose of the second CSI measurement resource set is for L1-SINR measurement if at least one of the following conditions is satisfied:

report information corresponding to a CSI measurement resource set used for channel measurement in the second CSI measurement resource set being related to "no report";

a CSI measurement resource set used for channel measurement in the second CSI measurement resource set being not used for time-frequency pursuit; and a CSI report set corresponding to the second CSI measurement resource set being associated with CSI measurement resources used for channel measurement and CSI measurement resources used for interference measurement.

12A. The apparatus according to any one of supplements 1A-11A, wherein if a CSI measurement resource used for channel measurement in the second CSI measurement resource set includes one of a CSI-RS and a SSB, and the CSI measurement resource used for channel measurement in the second CSI measurement resource set is used for measurement of beam management, a relationship between the CSI-RS or the SSB and a corresponding interference measurement resource is of a quasi-colocation (QCL) type C and/or a quasi-colocation type D.

13A. The apparatus according to any one of supplements 1A-11A, wherein if a CSI measurement resource used for channel measurement in the second CSI measurement resource set includes a CSI-RS and an SSB, a relationship between the CSI-RS and the SSB and a corresponding interference measurement resource is of a quasi-colocation type C and/or a quasi-colocation type D.

14A. The apparatus according to supplement 12A or 13A, wherein QCL assumptions of the CSI measurement resources used for channel measurement and corresponding interference measurement resources are identical, and/or, the number of subsets of CSI measurement resources used for channel measurement and the number of subsets of corresponding interference measurement resources are identical and sequentially correspond.

15A. The apparatus according to any one of supplements 1A-14A, wherein if the second CSI measurement resource set is related to at least one of L1-RSRP, L1-RSRQ and an L1-SINR, contents reported by the terminal equipment may consist of a part.

1B. An apparatus for indicating a resource occupied for channel state information calculation, configured in a terminal equipment, the apparatus including:

a receiving unit configured to receive third indication information transmitted by a network device, the third indication information indicating at least one of the following conditions associated with a first CSI report set that:

the first CSI report set needs to perform CSI report, and a content of the CSI report is related to at least one of an L1-SINR, L1-RSRQ and L1-RSRP;

the first CSI report set needs not to perform CSI report;

a CSI channel measurement resource set associated with the first CSI report set is not configured with repetition;

a CSI channel measurement resource set associated with the first CSI report set is configured with repetition;

a CSI channel measurement resource set associated with the first CSI report set is not used for time-frequency pursuit;

a CSI channel measurement resource set associated with the first CSI report set is used for time-frequency pursuit;

a CSI measurement resource set associated with the first CSI report set only includes channel measurement resource(s); and a CSI measurement resource set associated with the first CSI report set includes channel measurement resource(s) and interference measurement resource(s);

a determining unit configured to determine, according to the third indication information, a time (T) and the number (K) of CSI processing units (CPUs) occupied by CSI report or CSI measurement to which the first CSI report set corresponds.

2B. An apparatus for indicating a resource occupied for channel state information calculation, configured in a network device, the apparatus including:

a generating unit configured to generate third indication information, the third indication information indicating at least one of the following conditions associated with a first CSI report set that:

the first CSI report set needs to perform CSI report, and a content of the CSI report is related to at least one of an L1-SINR, L1-RSRQ and L1-RSRP;

the first CSI report set needs not to perform CSI report;

a CSI channel measurement resource set associated with the first CSI report set is not configured with repetition;

a CSI channel measurement resource set associated with the first CSI report set is configured with repetition;

a CSI channel measurement resource set associated with the first CSI report set is not used for time-frequency pursuit;

a CSI channel measurement resource set associated with the first CSI report set is used for time-frequency pursuit;

a CSI measurement resource set associated with the first CSI report set only includes channel measurement resource(s); and a CSI measurement resource set associated with the first CSI report set includes channel measurement resource(s) and interference measurement resource(s);

a transmitting unit configured to transmit the third indication information to a terminal equipment, the third indication information being used by the terminal equipment to determine a time (T) and the number (K) of CSI processing units (CPUs) occupied by CSI report or CSI measurement to which the first CSI report set corresponds.

3B. The apparatus according to supplement 1B or 2B, wherein the number (K) of CSI processing units occupied by CSI report or CSI measurement to which the first CSI report set corresponds is at least one of the following:

0;
1;
2;

$K_s$, which is at least one of the following: the number of SSB resources, the number of CSI-RS resources, a maximum value of the number of CSI-RS resources and the number of SSB resources, and a sum of the number of CSI-RS resources and the number of SSB resources; and $N_{CPU}$, which is the number of parallel CSI processing units supported by the terminal equipment.

4B. The apparatus according to supplement 3B, wherein,
if a CSI channel measurement resource set associated with the first CSI report set only includes SSBs, $K_s$ is the number of SSB resources;
if a CSI channel measurement resource set associated with the first CSI report set only includes CSI-RSs, $K_s$ is the number of CSI-RS resources;
if a CSI channel measurement resource set associated with the first CSI report set includes CSI-RSs and SSBs, $K_s$ is a maximum value of the number of CSI-RS resources and the number of SSB resources.

5B. The apparatus according to supplement 1B or 2B, wherein if the terminal equipment needs to perform CSI report, the time (T) of CSI processing units (CPUs) occupied by CSI report to which the first CSI report set corresponds is at least one of the following:

if the CSI report is aperiodic CSI report, the time (T) of CSI processing units (CPUs) occupied by the CSI report is: from a first or a last symbol after downlink control information triggering the CSI report to a first or a last symbol of an uplink shared channel or an uplink control channel carrying the CSI report;

if the CSI report is periodic CSI report, the time (T) of CSI processing units (CPUs) occupied by the CSI report is: from a first or a last symbol of a CSI measurement opportunity related to the CSI report to a first or a last symbol of an uplink shared channel or an uplink control channel carrying the CSI report;

if the CSI report is semi-persistent CSI report carried by an uplink shared channel and is initially triggered by downlink control information, the time (T) of CSI processing units (CPUs) occupied by the CSI report is: from a first or a last symbol after the downlink control information triggering the CSI report to a first or a last symbol of the uplink shared channel carrying the CSI report; and if the CSI report is semi-persistent CSI report carried by an uplink shared channel and is not initially triggered by downlink control information, the time (T) of CSI processing units (CPUs) occupied by the CSI report is: from a first or a last symbol of a CSI measurement opportunity related to the CSI report to a first or a last symbol of the uplink shared channel carrying the CSI report.

6B. The apparatus according to supplement 1B or 2B, wherein if the terminal equipment needs not to perform CSI report, the time (T) of CSI processing units (CPUs) occupied by CSI measurement to which the first CSI report set corresponds is at least one of the following:

if a time domain behavior to which the CSI report set corresponds is aperiodic, the time (T) of CSI processing units (CPUs) occupied by the CSI measurement to which the CSI report set corresponds is: from a first or a last symbol after the downlink control information triggering the CSI report set to a maximum value of $x+Z_0$ and $y+Z_1$;

if a time domain behavior to which the CSI report set corresponds is periodic, the time (T) of CSI processing units (CPUs) occupied by the CSI measurement to which the CSI report set corresponds is: from a first symbol of an earlier measurement opportunity in measurement opportunities of the CSI measurement resource related to the CSI report set in a transmission opportunity related to the CSI report set to $y'+Z_1$;

if a time domain behavior to which the CSI report set corresponds is semi-persistent and initial CSI resource measurement to which the CSI report set corresponds is triggered by downlink control information, for the initial CSI resource measurement, the time (T) of CSI processing units (CPUs) occupied by the CSI measurement to which the CSI report set corresponds is: from a first symbol after the downlink control information triggering the CSI report set to a maximum value of $x+Z_0$ and $y+Z_1$;

if a time domain behavior to which the CSI report set corresponds is semi-persistent but initial CSI resource measurement to which the CSI report set corresponds is not triggered by downlink control information, the time (T) of CSI processing units (CPUs) occupied by the CSI measurement to which the CSI report set corresponds is: from a first symbol of an earliest measurement opportunity in measurement opportunities of the CSI measurement resource related to the CSI report set to $y'+Z_1$; and if a time domain behavior to which the CSI report set corresponds is semi-persistent and initial CSI resource measurement to which the CSI report set corresponds is triggered by downlink control information, for other CSI resource measurement than the initial CSI resource measurement, the time (T) of CSI processing units (CPUs) occupied by the CSI measurement to which the CSI report set corresponds is: from a first symbol of an earliest measurement opportunity in measurement opportunities of the CSI measurement resource related to the CSI report set to $y'+Z_1$;

where, x is the first or the last symbol after the downlink control information triggering the CSI report set, y is a last symbol of a latest CSI channel measurement resource or interference measurement resource related to the CSI report set, y' is a first symbol of a latest measurement opportunity in transmission opportunities of the CSI measurement resource related to the CSI report set in the transmission opportunities, $Z_0$ is a CSI calculation time related to CSI measurement or report triggered by control information, and $Z_1$ is a CSI calculation time related to the CSI measurement resource.

What is claimed is:

1. An apparatus for determining a resource occupied for channel state information calculation, configured in a terminal equipment, the apparatus comprising:
a receiver configured to receive indication information transmitted by a network device, the indication information indicating that a CSI (Channel State Information) measurement resource set only comprises channel measurement resource(s) which is used as measurement resource(s), and the indication information further indicating that the first CSI report set needs to perform CSI report, and that a content of the CSI report is related to L1-SINR (layer 1-Signal to Interference Noise Ratio); and processor circuitry configured to determine, according to the indication information, a time (T) and a number (K) of CSI processing units (CPUs) occupied by CSI report or CSI measurement to which the first CSI report set corresponds, wherein the number, K, of CSI processing units occupied by CSI report or CSI measurement to which the first CSI report set corresponds is 1.

2. The apparatus according to claim 1, wherein,
in response to determining that a CSI channel measurement resource set associated with the first CSI report set only comprises SSBs (Synchronization Signal Blocks), $K_s$ is the number of SSB resources;
in response to determining that a CSI channel measurement resource set associated with the first CSI report set only comprises CSI-RSs (Channel State Information-Reference Signals), $K_s$ is the number of CSI-RS resources; or
in response to determining that a CSI channel measurement resource set associated with the first CSI report set comprises CSI-RSs and SSBs, $K_s$ is a maximum value of the number of CSI-RS resources and the number of SSB resources.

3. The apparatus according to claim 1, wherein,
in response to determining that the terminal equipment needs to perform CSI report, the time (T) of CSI processing units (CPUs) occupied by CSI report to which the first CSI report set corresponds is at least one of the following:
in response to determining that the CSI report is aperiodic CSI report, the time (T) of CSI processing units (CPUs) occupied by the CSI report is: from a first or a last symbol after downlink control information triggering the CSI report to a first or a last symbol of an uplink shared channel or an uplink control channel carrying the CSI report;
in response to determining that the CSI report is periodic CSI report, the time (T) of CSI processing units (CPUs) occupied by the CSI report is: from a first or a last symbol of a CSI measurement opportunity related to the CSI report to a first or a last symbol of an uplink shared channel or an uplink control channel carrying the CSI report;
in response to determining that the CSI report is semi-persistent CSI report carried by an uplink shared channel and is initially triggered by downlink control information, the time (T) of CSI processing units (CPUs) occupied by the CSI report is: from a first or a last symbol after the downlink control information triggering the CSI report to a first or a last symbol of the uplink shared channel carrying the CSI report; and
in response to determining that the CSI report is semi-persistent CSI report carried by an uplink shared channel and is not initially triggered by downlink control information, the time (T) of CSI processing units (CPUs) occupied by the CSI report is: from a first or a last symbol of a CSI measurement opportunity related to the CSI report to a first or a last symbol of the uplink shared channel carrying the CSI report.

4. The apparatus according to claim 1, wherein,
in response to determining that the terminal equipment needs not to perform CSI report, the time (T) of CSI processing units (CPUs) occupied by CSI measurement to which the first CSI report set corresponds is at least one of the following:

in response to determining that a time domain behavior to which the CSI report set corresponds is aperiodic, the time (T) of CSI processing units (CPUs) occupied by the CSI measurement to which the CSI report set corresponds is: from a first or a last symbol after the downlink control information triggering the CSI report set to a maximum value of $x+Z_0$ and $y+Z_1$;
in response to determining that a time domain behavior to which the CSI report set corresponds is periodic, the time (T) of CSI processing units (CPUs) occupied by the CSI measurement to which the CSI report set corresponds is: from a first symbol of an earlier measurement opportunity in measurement opportunities of the CSI measurement resource related to the CSI report set in a transmission opportunity related to the CSI report set to $y'+Z_1$;
in response to determining that a time domain behavior to which the CSI report set corresponds is semi-persistent and initial CSI resource measurement to which the CSI report set corresponds is triggered by downlink control information, for the initial CSI resource measurement, the time (T) of CSI processing units (CPUs) occupied by the CSI measurement to which the CSI report set corresponds is: from a first symbol after the downlink control information triggering the CSI report set to a maximum value of $x+Z_0$ and $y+Z_1$;
in response to determining that a time domain behavior to which the CSI report set corresponds is semi-persistent but initial CSI resource measurement to which the CSI report set corresponds is not triggered by downlink control information, the time (T) of CSI processing units (CPUs) occupied by the CSI measurement to which the CSI report set corresponds is: from a first symbol of an earliest measurement opportunity in measurement opportunities of the CSI measurement resource related to the CSI report set to $y'+Z_1$; and
in response to determining that a time domain behavior to which the CSI report set corresponds is semi-persistent and initial CSI resource measurement to which the CSI report set corresponds is triggered by downlink control information, for other CSI resource measurement than the initial CSI resource measurement, the time (T) of CSI processing units (CPUs) occupied by the CSI measurement to which the CSI report set corresponds is: from a first symbol of an earliest measurement opportunity in measurement opportunities of the CSI measurement resource related to the CSI report set to $y'+Z_1$;
where, x is the first or the last symbol after the downlink control information triggering the CSI report set, y is a last symbol of a latest CSI channel measurement resource or interference measurement resource related to the CSI report set, y' is a first symbol of a latest measurement opportunity in transmission opportunities of the CSI measurement resource related to the CSI report set in the transmission opportunities, $Z_0$ is a CSI calculation time related to CSI measurement or report triggered by control information, and $Z_1$ is a CSI calculation time related to the CSI measurement resource.

* * * * *